US011832335B2

(12) United States Patent
Ly et al.

(10) Patent No.: US 11,832,335 B2
(45) Date of Patent: Nov. 28, 2023

(54) DYNAMIC CONNECTED DISCONTINUOUS RECEPTION CONFIGURATION SUPPORTING NETWORK POWER MODES

(71) Applicant: QUALCOMM Incorporated, San Diego, CA (US)

(72) Inventors: Hung Dinh Ly, San Diego, CA (US); Huilin Xu, Temecula, CA (US); Muhammad Sayed Khairy Abdelghaffar, San Jose, CA (US); Hwan Joon Kwon, San Diego, CA (US); Krishna Kiran Mukkavilli, San Diego, CA (US); Linhai He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 17/379,782

(22) Filed: Jul. 19, 2021

(65) Prior Publication Data
US 2023/0020254 A1    Jan. 19, 2023

(51) Int. Cl.
*H04W 76/28*   (2018.01)
*H04W 52/02*   (2009.01)

(52) U.S. Cl.
CPC ....... *H04W 76/28* (2018.02); *H04W 52/0212* (2013.01)

(58) Field of Classification Search
None
See application file for complete search history.

(56) References Cited

U.S. PATENT DOCUMENTS

| 2012/0263051 | A1  | 10/2012 | Willars et al. |
| 2015/0131505 | A1  | 5/2015  | Dai |
| 2017/0041877 | A1  | 2/2017  | Wang et al. |
| 2020/0037396 | A1  | 1/2020  | Islam et al. |
| 2020/0245396 | A1  | 7/2020  | Dhanda et al. |
| 2022/0086761 | A1* | 3/2022  | Maleki ............. H04W 52/0216 |
| 2022/0377830 | A1* | 11/2022 | Mecum ................. H04W 76/28 |

FOREIGN PATENT DOCUMENTS

KR   20190111767 A   10/2019

OTHER PUBLICATIONS

International Search Report and Written Opinion—PCT/US2022/034323—ISA/EPO—dated Oct. 21, 2022.

\* cited by examiner

*Primary Examiner* — Diane L Lo
(74) *Attorney, Agent, or Firm* — Holland & Hart LLP; James Hunt Yancey, Jr.

(57) ABSTRACT

Methods, systems, and devices for dynamically configuring connected discontinuous reception (C-DRX) configurations supporting network power modes are described. In some examples, a user equipment (UE) may receive a first control signaling configuring the UE with multiple C-DRX configurations, each C-DRX configuration of the multiple C-DRX configurations corresponding to a respective network power mode. In some examples, the UE may receive a second control signaling including an identifier indicating a C-DRX configuration, of the multiple C-DRX configurations, corresponding to a first network power mode (e.g., an enhanced network power savings mode) at a base station, where the first network power mode may indicated a set of features active at the base station. The UE may communicate with the base station in accordance with the indicated C-DRX configuration and based on the first network power mode.

30 Claims, 18 Drawing Sheets

DYNAMIC CONNECTED DISCONTINUOUS RECEPTION CONFIGURATION SUPPORTING NETWORK POWER MODES

FIELD OF TECHNOLOGY

The following relates to wireless communications, including dynamic connected discontinuous reception (C-DRX) configuration supporting network power modes.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support dynamic connected discontinuous reception (C-DRX) configuration supporting network power modes. Generally, the described techniques provide for a base station configuring one or more user equipment (UEs) with one or more C-DRX configurations that may be associated with enhanced network power savings (e.g., a network power saving mode). In some examples, the base station may transmit one or more C-DRX configurations based on discontinuous transmission (DTX) communications (e.g., DTX active periods) by the base station, and in some examples this may be based on a base station 105 power mode (e.g., a relatively low power mode), resulting in greater alignment between DTX active periods and DRX active periods. For example, the base station may transmit one or more control signals to the one or more UEs configuring the one or more UEs with a set of C-DRX configurations that the one or more UEs may choose from or be configured to use when performing DRX communications. The base station may transmit control signaling indicating a single C-DRX configuration of the set of C-DRX configurations and as such, the base station and the one or more UEs may support dynamically signaling which C-DRX configuration the one or more UEs may use. In some examples, such dynamic signaling may support the base station operating in a relatively low power mode, and thus, a network power saving mode, resulting in greater system synchronization, enhanced system power savings, and lower network latency.

A method for wireless communications at a UE is described. The method may include receiving first control signaling configuring the UE with a set of multiple C-DRX configurations, each C-DRX configuration of the set of multiple C-DRX configurations corresponding to a respective network power mode, receiving second control signaling including an identifier indicating a C-DRX configuration of the set of multiple C-DRX configurations corresponding to a first network power mode at a base station, the first network power mode indicating a set of features currently active at the base station, and communicating with the base station according to the indicated C-DRX configuration and based on the first network power mode.

An apparatus for wireless communications at a UE is described. The apparatus may include a processor, memory coupled with the processor, and instructions stored in the memory. The instructions may be executable by the processor to cause the apparatus to receive first control signaling configuring the UE with a set of multiple C-DRX configurations, each C-DRX configuration of the set of multiple C-DRX configurations corresponding to a respective network power mode, receive second control signaling including an identifier indicating a C-DRX configuration of the set of multiple C-DRX configurations corresponding to a first network power mode at a base station, the first network power mode indicating a set of features currently active at the base station, and communicate with the base station according to the indicated C-DRX configuration and based on the first network power mode.

Another apparatus for wireless communications at a UE is described. The apparatus may include means for receiving first control signaling configuring the UE with a set of multiple C-DRX configurations, each C-DRX configuration of the set of multiple C-DRX configurations corresponding to a respective network power mode, means for receiving second control signaling including an identifier indicating a C-DRX configuration of the set of multiple C-DRX configurations corresponding to a first network power mode at a base station, the first network power mode indicating a set of features currently active at the base station, and means for communicating with the base station according to the indicated C-DRX configuration and based on the first network power mode.

A non-transitory computer-readable medium storing code for wireless communications at a UE is described. The code may include instructions executable by a processor to receive first control signaling configuring the UE with a set of multiple C-DRX configurations, each C-DRX configuration of the set of multiple C-DRX configurations corresponding to a respective network power mode, receive second control signaling including an identifier indicating a C-DRX configuration of the set of multiple C-DRX configurations corresponding to a first network power mode at a base station, the first network power mode indicating a set of features currently active at the base station, and communicate with the base station according to the indicated C-DRX configuration and based on the first network power mode.

Some examples of the method, apparatuses, and non-transitory computer-readable medium described herein may further include operations, features, means, or instructions for receiving third control signaling before receiving the first control signaling, the third control signaling configuring the UE with a first set of multiple C-DRX configurations, where the set of multiple C-DRX configurations includes a second set of multiple C-DRX configurations, and where the first control signaling configures the UE with the second set of multiple C-DRX configurations that may be a subset of the first set of multiple C-DRX configurations.

In some examples of the method, apparatuses, and non-transitory computer-readable medium described herein, the first control signaling indicates a mapping of bit values from a set of multiple bit values to respective C-DRX configurations of the second set of multiple C-DRX configurations and the identifier of the second control signaling includes a bit field indicating a bit value of the set of multiple bit values corresponding to the indicated C-DRX configuration according to the mapping.

In some examples of the method, apparatuses, and non-transitory computer-readable medium described herein, a quantity of C-DRX configurations in the second set of multiple C-DRX configurations may be based on a size of the bit field.

In some examples of the method, apparatuses, and non-transitory computer-readable medium described herein, the third control signaling includes radio resource control (RRC) signaling, the first control signaling includes a medium access control element (MAC-CE), and the second control signaling includes a downlink control information (DCI) message.

In some examples of the method, apparatuses, and non-transitory computer-readable medium described herein, the first control signaling includes RRC signaling and the second control signaling includes a DCI message, a MAC-CE, or both.

Some examples of the method, apparatuses, and non-transitory computer-readable medium described herein may further include operations, features, means, or instructions for switching to the indicated C-DRX configuration after receiving the second control signaling according to a timeline, where communicating with the base station according to the indicated C-DRX configuration may be based on the switching.

Some examples of the method, apparatuses, and non-transitory computer-readable medium described herein may further include operations, features, means, or instructions for determining the timeline based on the first control signaling, the second control signaling, or both, where switching to the indicated C-DRX configuration may be based on determining the timeline.

Some examples of the method, apparatuses, and non-transitory computer-readable medium described herein may further include operations, features, means, or instructions for transmitting a UE capability message indicating the timeline, where switching to the indicated C-DRX configuration may be based on the UE capability message indicating the timeline.

Some examples of the method, apparatuses, and non-transitory computer-readable medium described herein may further include operations, features, means, or instructions for receiving third control signaling including a second identifier indicating a second C-DRX configuration of the set of multiple C-DRX configurations, the indicated second C-DRX configuration corresponding to a second network power mode at the base station and communicating with the base station according to the indicated second C-DRX configuration and based on the second network power mode.

Some examples of the method, apparatuses, and non-transitory computer-readable medium described herein may further include operations, features, means, or instructions for determining an active time for the indicated C-DRX configuration based on the first control signaling, the second control signaling, or both, where communicating with the base station according to the indicated C-DRX configuration may be further based on the active time and switching to a default C-DRX configuration after the active time.

Some examples of the method, apparatuses, and non-transitory computer-readable medium described herein may further include operations, features, means, or instructions for determining the default C-DRX configuration based on the first control signaling, where switching to the default C-DRX configuration may be based on determining the default C-DRX configuration.

Some examples of the method, apparatuses, and non-transitory computer-readable medium described herein may further include operations, features, means, or instructions for activating one or more network power saving features at the UE based on the set of features currently active at the base station indicated by the first network power mode, where communicating with the base station according to the indicated C-DRX configuration may be further based on the activated one or more network power saving features.

In some examples of the method, apparatuses, and non-transitory computer-readable medium described herein, communicating with the base station may include operations, features, means, or instructions for determining an active subset of transmission reception points of the base station corresponding to the first network power mode and communicating with one or more transmission reception points of the active subset of transmission reception points.

In some examples of the method, apparatuses, and non-transitory computer-readable medium described herein, communicating with the base station may include operations, features, means, or instructions for determining an active subset of communication beams of the base station corresponding to the first network power mode and communicating using one or more communication beams of the active subset of communication beams.

In some examples of the method, apparatuses, and non-transitory computer-readable medium described herein, the first network power mode includes a nominal power mode or an enhanced power saving mode.

A method for wireless communications at a base station is described. The method may include transmitting first control signaling configuring a UE with a set of multiple C-DRX configurations, each C-DRX configuration of the set of multiple C-DRX configurations corresponding to a respective network power mode, operating using a set of features currently active at the base station according to a first network power mode at the base station, transmitting, to the UE, second control signaling including an identifier indicating a C-DRX configuration of the set of multiple C-DRX configurations for the UE, the indicated C-DRX configuration corresponding to the first network power mode at the base station, and communicating with the UE according to the indicated C-DRX configuration and based on the first network power mode.

An apparatus for wireless communications at a base station is described. The apparatus may include a processor, memory coupled with the processor, and instructions stored in the memory. The instructions may be executable by the processor to cause the apparatus to transmit first control signaling configuring a UE with a set of multiple C-DRX configurations, each C-DRX configuration of the set of multiple C-DRX configurations corresponding to a respective network power mode, operate using a set of features currently active at the base station according to a first network power mode at the base station, transmit, to the UE, second control signaling including an identifier indicating a C-DRX configuration of the set of multiple C-DRX configurations for the UE, the indicated C-DRX configuration corresponding to the first network power mode at the base station, and communicate with the UE according to the indicated C-DRX configuration and based on the first network power mode.

Another apparatus for wireless communications at a base station is described. The apparatus may include means for transmitting first control signaling configuring a UE with a set of multiple C-DRX configurations, each C-DRX configuration of the set of multiple C-DRX configurations corresponding to a respective network power mode, means for operating using a set of features currently active at the base station according to a first network power mode at the base station, means for transmitting, to the UE, second control signaling including an identifier indicating a C-DRX configuration of the set of multiple C-DRX configurations for the UE, the indicated C-DRX configuration corresponding to the first network power mode at the base station, and means for communicating with the UE according to the indicated C-DRX configuration and based on the first network power mode.

A non-transitory computer-readable medium storing code for wireless communications at a base station is described. The code may include instructions executable by a processor to transmit first control signaling configuring a UE with a set of multiple C-DRX configurations, each C-DRX configuration of the set of multiple C-DRX configurations corresponding to a respective network power mode, operate using a set of features currently active at the base station according to a first network power mode at the base station, transmit, to the UE, second control signaling including an identifier indicating a C-DRX configuration of the set of multiple C-DRX configurations for the UE, the indicated C-DRX configuration corresponding to the first network power mode at the base station, and communicate with the UE according to the indicated C-DRX configuration and based on the first network power mode.

Some examples of the method, apparatuses, and non-transitory computer-readable medium described herein may further include operations, features, means, or instructions for transmitting third control signaling before transmitting the first control signaling, the third control signaling configuring the UE with a first set of multiple C-DRX configurations, where the set of multiple C-DRX configurations includes a second set of multiple C-DRX configurations and the first control signaling configures the UE with the second set of multiple C-DRX configurations that may be a subset of the first set of multiple C-DRX configurations.

In some examples of the method, apparatuses, and non-transitory computer-readable medium described herein, the first control signaling indicates a mapping of bit values from a set of multiple bit values to respective C-DRX configurations of the second set of multiple C-DRX configurations and the identifier of the second control signaling includes a bit field indicating a bit value of the set of multiple bit values corresponding to the indicated C-DRX configuration according to the mapping.

Some examples of the method, apparatuses, and non-transitory computer-readable medium described herein may further include operations, features, means, or instructions for selecting the second set of multiple C-DRX configurations based on a quantity of C-DRX configurations supported by the second control signaling according to a size of the bit field.

In some examples of the method, apparatuses, and non-transitory computer-readable medium described herein, the third control signaling includes RRC signaling, the first control signaling includes a MAC-CE, and the second control signaling includes a DCI message.

In some examples of the method, apparatuses, and non-transitory computer-readable medium described herein, the first control signaling includes RRC signaling and the second control signaling includes a DCI message, a MAC-CE, or both.

Some examples of the method, apparatuses, and non-transitory computer-readable medium described herein may further include operations, features, means, or instructions for operating according to a DTX configuration, where an on duration of the DTX configuration may be at least partially concurrent with an on duration of the indicated C-DRX configuration.

Some examples of the method, apparatuses, and non-transitory computer-readable medium described herein may further include operations, features, means, or instructions for selecting the indicated C-DRX configuration based on the DTX configuration, where transmitting the second control signaling may be based on the selecting.

Some examples of the method, apparatuses, and non-transitory computer-readable medium described herein may further include operations, features, means, or instructions for switching to a second network power mode at the base station different from the first network power mode, activating one or more first features at the base station, deactivating one or more second features at the base station, or both based on the set of features currently active at the base station and the second network power mode, and transmitting, to the UE, third control signaling including a second identifier indicating a second C-DRX configuration of the set of multiple C-DRX configurations for the UE, the indicated second C-DRX configuration corresponding to the second network power mode at the base station.

Some examples of the method, apparatuses, and non-transitory computer-readable medium described herein may further include operations, features, means, or instructions for triggering the switching to the second network power mode based on a change in UE traffic at the base station, a change in one or more channel metrics at the base station, or a combination thereof.

In some examples of the method, apparatuses, and non-transitory computer-readable medium described herein, operating using the set of features currently active at the base station may include operations, features, means, or instructions for determining an active subset of transmission reception points of the base station, an active subset of communication beams of the base station, or both corresponding to the first network power mode, where communicating with the UE includes communicating with the UE using one or more transmission reception points of the active subset of transmission reception points, one or more communication beams of the active subset of communication beams, or both.

DETAILED DESCRIPTION

Figure 1:
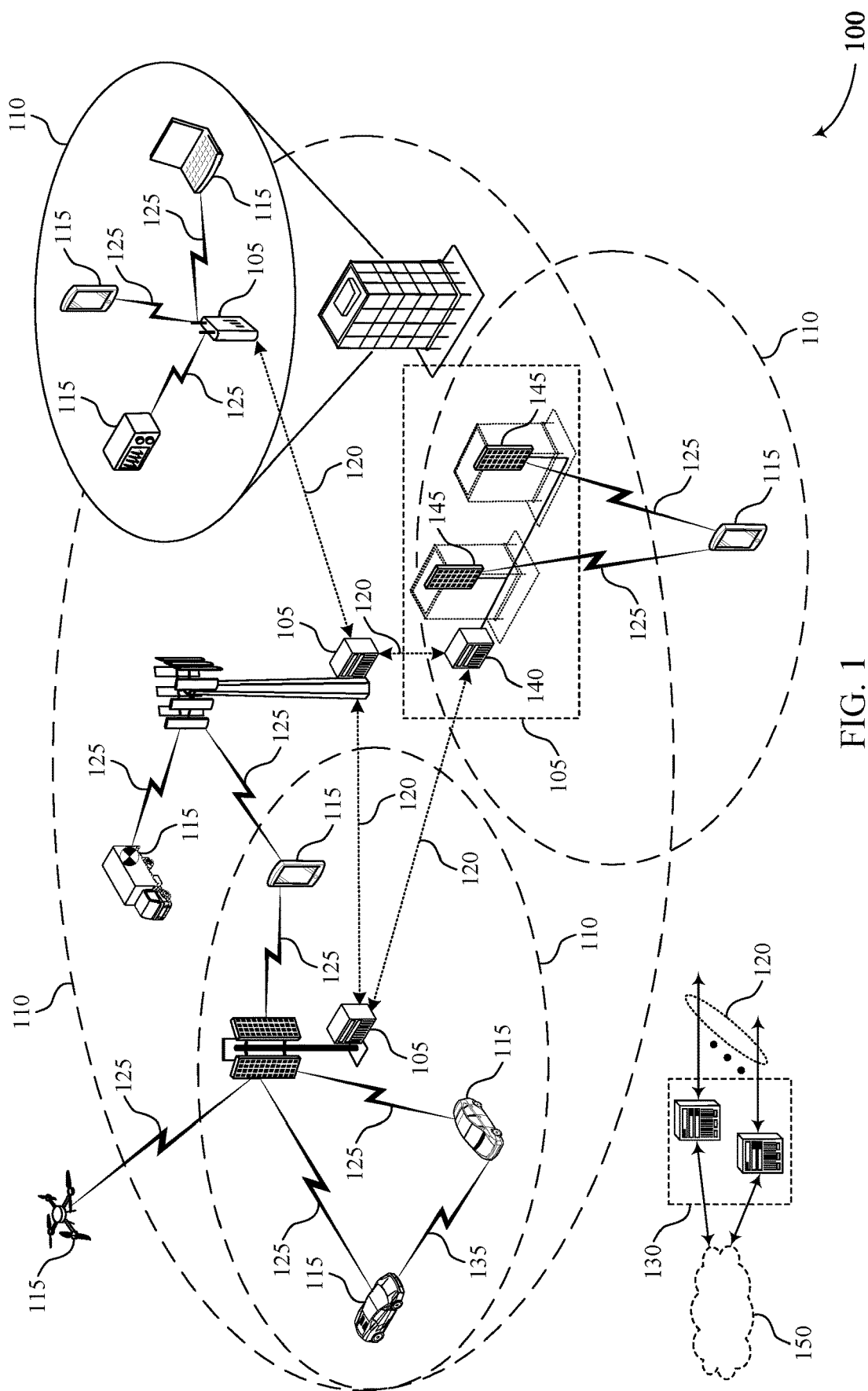
FIGS. 1 and 2 illustrate examples of wireless communications systems that support dynamic connected discontinuous reception (C-DRX) configuration supporting network power modes in accordance with aspects of the present disclosure.

In some cases, a base station may configure one or more UEs with discontinuous reception (DRX) configurations such that the UEs may monitor for transmissions from the base station during active periods and may refrain from monitoring for transmissions from the base station during inactive periods. The base station may provide the one or more UEs with one or more parameters to determine the active periods and the inactive periods. In some cases, a base station may configure user equipment (UEs) with one or more connected discontinuous reception (C-DRX) configurations. A C-DRX configuration may indicate active durations in which a UE may wake up from a sleep mode and monitor for transmissions from the base station. The C-DRX configuration may enable the UE to consume relatively less power by operating in a sleep mode (e.g., a lower-power mode) during periods of inactivity of the C-DRX configuration. Similarly, the base station may operate according to a discontinuous transmission (DTX) configuration resulting in the base station conserving power by operating in a sleep mode during inactive periods (e.g., periods associated with low network traffic).

In some cases, the base station may be configured to modify DTX communications in accordance with a network power mode. For example, the network may transition into a lower power mode, thereby operating the base station in a lower power mode where, in some cases, the base station may modify DTX communications accordingly. For example, the base station may reduce a number of communication beams, transmission and reception points (TRPs), and any other communication feature associated with the low power mode, and the base station may modify active periods and inactive periods for DTX communications accordingly. In other words, a network power mode, and the like may be associated with dynamically modifying DTX communications. In some cases, however, C-DRX configurations may be configured irrespective of a network power mode, and thus, may be deficient.

In some examples, the base station may configure the UE with one or more C-DRX configurations that may be associated with enhanced network power savings (e.g., the network power mode). For example, the base station may transmit first control signaling to the UE indicating one or more C-DRX configurations. A first C-DRX configuration may include one or more nominal power mode C-DRX configurations for when the base station is not in a low power mode (e.g., not in a network power saving mode). A second C-DRX configuration may include one or more C-DRX configurations associated with the base station DTX configurations when the base station is in a low power mode. Further, the base station may transmit, to the UE, second control signaling, including a configuration identifier, indicating which C-DRX configuration of the C-DRX configurations from the first control signaling may be used. In some examples, the base station may use multiple control signals, such as three control signals, to configure the UE. That is, the base station may transmit first control signaling to indicate the C-DRX configurations, and second control signaling to indicate a subset of the C-DRX configurations along with a set of identifiers mapping each C-DRX configuration of the subset of C-DRX configurations to a respective bit value. The base station may transmit third control signaling including a field with a bit value corresponding to one C-DRX configuration of the subset of C-DRX configurations in accordance with the set of identifiers. Regardless of the number of control signals (e.g., two control signals or three control signals) to indicate the C-DRX configurations, the techniques as described herein may allow the base station to dynamically switch the UE between C-DRX configurations as the base station switches between network power saving modes.

In some examples, the base station may serve more than one UE, and the base station may align the active durations of the UEs by configuring the UEs with respective C-DRX configurations (or C-DRX configurations with partially overlapping or fully overlapping inactive durations). That is, the base station may use a C-DRX configuration to align communications with the UEs and achieve network power savings.

Configuring UEs to use C-DRX configurations that correspond to enhanced network power saving may result in enhanced system synchronization. For example, UEs configured to use C-DRX configurations associated with power saving at the network as described herein may better align active DRX durations and active DTX durations, increasing signal throughput, reducing system latency from misaligned communication intervals (e.g., active durations), and conserving communication resources such as power.

Aspects of the disclosure are initially described in the context of wireless communications systems. Aspects of the disclosure are then described in the context of communications schemes and a process flow. Aspects of the disclosure are further illustrated by and described with reference to apparatus diagrams, system diagrams, and flowcharts that relate to dynamic C-DRX configuration supporting network power modes.

FIG. 1 illustrates an example of a wireless communications system 100 that supports dynamic C-DRX configuration supporting network power modes in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or TRPs. Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, a base station 105 may configure UEs 115 with one or more C-DRX configurations. A C-DRX configuration may indicate active durations in which a UE 115 may wake up from a sleep mode and monitor for transmissions from the base station 105. The C-DRX configuration may enable the UE 115 to consume less power by operating in a sleep mode (e.g., a low-power mode) during periods of inactivity of the C-DRX configuration. Similarly, the base station 105 may operate according to a DTX configuration resulting in the base station 105 conserving power by operating in a sleep mode during inactive periods (e.g., periods associated with low network traffic).

In some examples, the base station 105 may configure the UE 115 with one or more C-DRX configurations that may be associated with enhanced network power savings (e.g., the network power mode). For example, the base station may transmit a first control signaling to the UE indicating one or more C-DRX configurations. A first C-DRX configuration may include one or more nominal power mode C-DRX configurations for when the base station 105-a is not in a low power mode (e.g., not in a network power saving mode). A second C-DRX configuration may include one or more C-DRX configurations associated with the base station DTX configurations when the base station is in a low power mode. Further, the base station may transmit, to the UE, second control signaling, including a configuration identifier, indicating which C-DRX configuration of the C-DRX configurations from the first control signaling may be used. In some examples, the base station may use three control signals to configure the UE 115-a. That is, the base station may transmit the first control signaling to indicate the C-DRX configurations, second control signaling to indicate a subset of the C-DRX configurations along with a set of identifiers mapping each C-DRX configuration of the subset of C-DRX configurations to a respective bit value. The base station may transmit third control signaling including a field with a bit value corresponding to one C-DRX configuration of the subset of C-DRX configurations in accordance with the set of identifiers. Whether using two control signals or three control signals to indicate the C-DRX configurations, the techniques as described herein may allow the base station to dynamically switch the UE between C-DRX configurations as the base station switches between network power saving modes.

Figure 2:
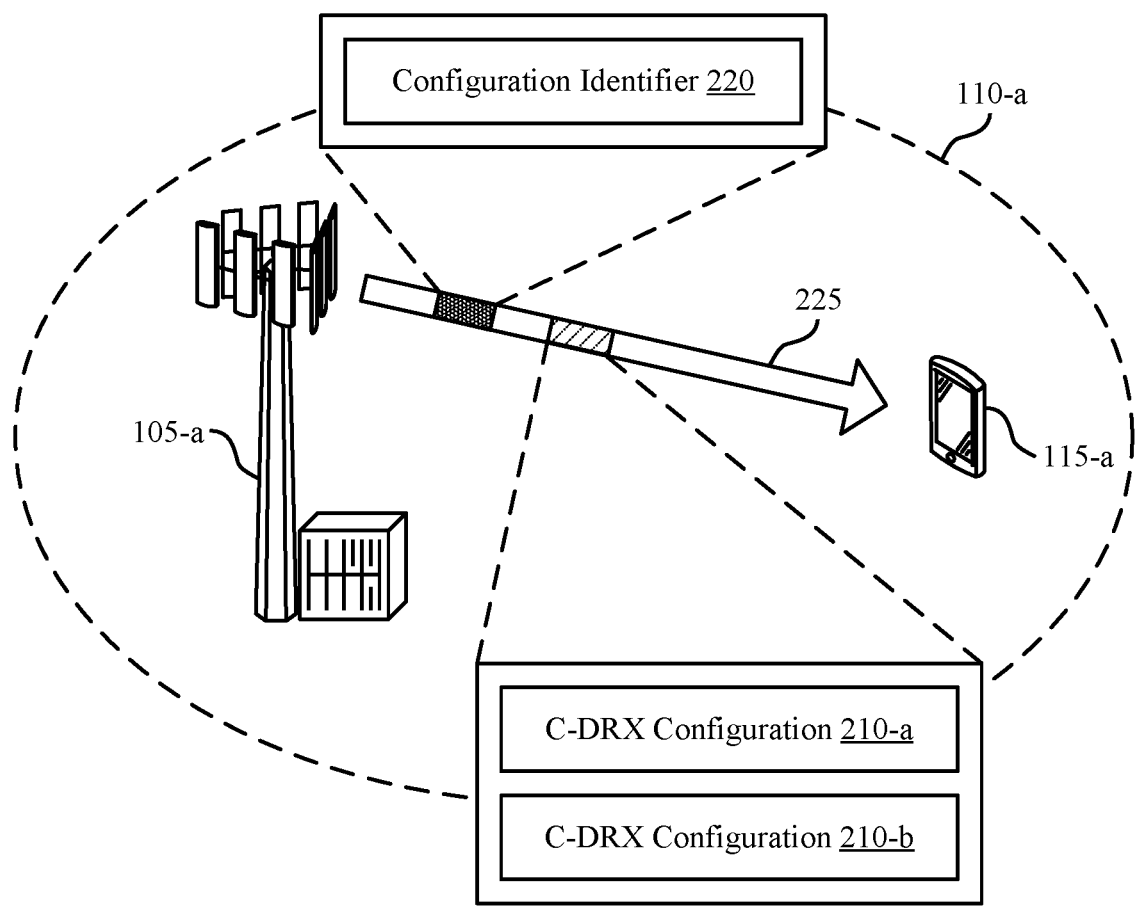

FIG. 2 illustrates an example of a wireless communications system 200 that supports dynamic C-DRX configuration supporting network power modes in accordance with aspects of the present disclosure. The wireless communications system 200 may implement or be implemented by aspects of the wireless communications system 100. For example, the wireless communications system 200 may include a base station 105-a and a UE 115-a, which may be examples of corresponding devices described with reference to FIG. 1. The base station 105-a may communicate with the UE 115-a in a geographic coverage area 110-a, which may be an example of a geographic coverage area 110 described with reference to FIG. 1. The base station 105-a and the UE 115-a may communicate according to discontinuous communication configurations (e.g., DTX, DRX), in some cases, considering a network enhanced power saving mode.

In some cases, the base station 105-a may configure UEs 115 with C-DRX configurations 210, such as UE-specific C-DRX configurations. A C-DRX configuration 210 may indicate active durations in which the UE 115-a may wake up from a sleep mode and monitor for transmissions from the base station 105-a. In some examples, the base station 105-a may provide the UE 115-a with one or more parameters (e.g., a periodicity, an active time) associated with performing C-DRX communications. The C-DRX configuration 210 may enable the UE 115-a to consume less power by operating in a sleep mode (e.g., a low-power mode) during periods of inactivity of the C-DRX configuration 210.

Similarly, the base station 105-a may operate according to a DTX configuration resulting in the base station 105-a conserving power by operating in a sleep mode during inactive periods (e.g., periods associated with low network traffic). The DTX configuration may include active durations in which the base station 105-a may be configured to wake up from a sleep mode to transmit messages (e.g., physical downlink control channel (PDCCH) transmissions) to the UE 115-a. For example, the base station 105-a may be, or may be part of, a network that supports enhanced network power savings. Networks that support enhanced network power savings may modify one or more communication parameters to increase communications efficiency at the network, for example, to reduce power consumption and, in some cases, to mitigate adverse environmental factors (e.g., to reduce carbon emissions). Switching to an enhanced network power saving mode may cause a network to use less communication beams, less transmission and reception points, to switch one or more communication devices to a low power mode, among other network modifications associated with reducing power consumption, making power consumption more efficient, or a combination thereof. For example, the base station 105-a may be part of a network switching to an enhanced network power savings mode and may thus transition into a low power mode, such as a sleep mode, a deep sleep mode, or any other power mode associated with the enhanced network power savings mode. In such a case, the base station 105-a may intermittently communicate with one or more other devices during active periods and may refrain from communicating during scheduled inactive periods. That is, the base station 105-a may use DTX communications to conserve power at the network side. In some cases, DTX capabilities and function may be influenced by, or otherwise associated with DRX configurations 210. For example, if the base station 105-a uses DTX communications, the UE 115-a may monitor for control signaling (e.g., PDCCH) during periods where the UE 115-a and the base station 105-a may be concurrently active. As such, the base station 105-a may experience improved power savings if active durations of the UE 115-a and the active durations of the base station 105-a overlap in the time domain.

The base station 105-a operating according to a DTX configuration may be particularly useful in wireless communications systems (e.g., 5G networks) using larger bandwidths, an increased number of antennas, an increased number of frequency bands, or a combination thereof. That is, compared to other networks (e.g., LTE networks), networks using larger bandwidths, an increased number of antennas, and an increased number of frequency bands may use more power, and as such, may benefit from network power saving features such as discontinuous communications. Further, switching to a low power mode and using DTX communications may be useful during time periods where transmission traffic load is particularly low (e.g., as compared to high density UE 115 scenarios) because the probability of empty TTIs (e.g., slots, frames, subframes, mini-slots, symbols, spans, or any other duration) occurring, the ability to schedule empty TTIs, or both may be increased. In other words, using DTX communications during time periods with low traffic mode, the base station 105-a may identify more opportunities to align inactive periods with TTIs largely devoid of communications. As such, configuring a base station 105-a to switch to a low power mode using DTX communications may allow the network to conserve power, in some cases, while mitigating throughput loss (e.g., compared to a scenario with relatively large and ubiquitous traffic load).

In some cases, the traffic load for the base station 105-a may vary from time to time which may cause the base station 105-a to refrain from using DTX communications, update or modify one or more DTX configurations, or make any other modification associated with changing DTX communications. Further, the base station 105-a may be configured to modify DTX communications in accordance with a network power mode. For example, the network may transition into a relatively lower power mode, thereby operating the base station 105-a in a lower power mode where, in some cases, the base station 105-a may modify DTX communications accordingly. In other words, traffic load, a network power mode, and the like may be associated with dynamically modifying DTX communications. However, in some cases, C-DRX configurations 210 may be configured irrespective of a network power mode (e.g., the base station 105-a low power mode), or irrespective of varying traffic load, and thus, may be deficient.

In some examples, the base station 105-a may configure the UE 115-a with one or more C-DRX configurations 210 that may be associated with enhanced network power savings (e.g., the network power mode). In other words, the base station 105-a may transmit one or more C-DRX configurations 210 based on DTX communications (e.g., DTX active periods), in some cases considering a base station 105-a low power mode, resulting in greater alignment between DTX active periods and DRX active periods. For example, the base station 105-a may transmit first control signaling 205 to the UE 115-a indicating a first C-DRX configuration 210-a and a second C-DRX configuration 210-b over a communication link 225 (e.g., a downlink control channel). The first C-DRX configuration 210 may include one or more nominal power mode C-DRX configurations for when the base station 105-*a* is not in a low power mode (e.g., not in a network power saving mode). For example, the first C-DRX configuration 210-*a* may enable the UE 115-*a* to align DRX active periods base station 105-*a* communications when the base station 105-*a* operates in a power mode different from the low power mode (e.g., a normal or nominal operating mode). The second C-DRX configuration 210-*b* may include one or more C-DRX configurations 210 associated with base station 105-*a* DTX configurations when the base station 105-*a* is in a low power mode. For example, using the second C-DRX configuration 210-*b*, the UE 115-*a* may align DRX active periods with DTX active periods when the base station 105-*a* operates in a low power mode (e.g., in accordance with a network power saving mode). In some examples, the base station 105-*a* may indicate multiple configurations in the second C-DRX configuration 210-*b*, to the UE 115-*a*, where each configuration of the second C-DRX configuration 210-*b* may be associated with a respective network power mode. For example, in the second C-DRX configuration 210-*b*, the base station 105-*a* may indicate a first UE-specific C-DRX configuration associated with a sleep mode at the base station 105-*a* and the base station 105-*a* may indicate a second UE-specific C-DRX configuration 210-*b* associated with a deep sleep mode at the base station 105-*a*. As such, the UE 115-*a* may align active DRX durations and active DTX durations in accordance with a network power mode. The base station 105-*a* may transmit the first control signaling 205 as, or within, an RRC message. In some cases, the RRC message, and thus the first control signaling 205, may be received by a single UE 115 or multiple UEs 115. For example, the base station 105-*a* may communicate with multiple UEs 115 and the base station 105-*a* may transmit the first control signaling 205 to the multiple UEs 115, in some cases, aligning communications between the multiple UEs 115 and the base station 105-*a*. In other words, the base station 105-*a* may transmit the first control signaling 105-*a* including the first C-DRX configuration 210-*a* and the second C-DRX configuration 210-*b* to align multiple UE 115 DRX active periods (e.g., which may correspond to different UEs 115), and in some cases, DTX active periods.

In some examples, the base station 105-*a* may transmit, to the UE 115-*a*, second control signaling 215, including a configuration identifier 220, indicating which C-DRX configuration 210 may be used. The second control signaling 215 may be a physical layer message (e.g., a layer 1 (L1) message), such as a downlink control information (DCI), a MAC-CE, or the like. For example, the base station 105-*a* may transmit a DCI message to the UE 115-*a* including the configuration identifier 220, pointing to a C-DRX configuration 210. In some cases, the base station 105-*a* may denote the configuration identifier 220 as an explicit indication of which power mode (e.g., sleep mode, deep sleep mode) the base station 105-*a* operates in, such that if the base station 105-*a* configured the UE 115-*a* with multiple configurations in the second C-DRX configuration 210-*b*, the UE 115-*a* may be able to identify the indicated C-DRX configuration 210 to use, the network power mode, or a combination thereof. In other cases, the base station 105-*a* may configure the UE 115-*a* with a single C-DRX configuration 210 in the second C-DRX configuration 210-*b*. As such, the base station 105-*b* may transmit the configuration identifier 220, indicating the UE 115-*a* to use the single C-DRX configuration 210. For example, the UE 115-*a* may operate according to one enhanced network power saving C-DRX configuration 210, and as such, the UE 115-*a* may switch between the first C-DRX configuration 210-*a* and the second C-DRX configuration 210-*b* in accordance with the second control signaling 215.

In some examples, the base station 105-*a* may use multiple control signals, such as three control signals to configure the UE 115-*a*. That is, the base station 105-*a* may transmit the first control signaling 205 (e.g., RRC signaling) to indicate the C-DRX configurations 210, and second control signaling 215 (e.g., a MAC-CE) to indicate a subset of the C-DRX configurations 210 along with a set of identifiers (e.g., a bit map) mapping each C-DRX configuration 210 of the subset of C-DRX configurations 210 to a respective value. The base station 105-*a* may transmit third control signaling (e.g., a DCI message) including a field with a bit value corresponding to one C-DRX configuration 210 of the subset of C-DRX configurations 210 in accordance with the set of identifiers. Whether using two control signals (e.g., first control signaling 205 and second control signaling 215) or three control signals (e.g., first control signaling 205, second control signaling 215, and third control signaling) to indicate the C-DRX configurations 210, the techniques as described herein may allow the base station 105-*a* to dynamically switch the UE 115-*a* between C-DRX configurations as the base station 105-*a* switches between network power saving modes. For example, the base station 105-*a* may switch to a first power saving mode and may accordingly transmit a control signal (e.g., such as the second control signaling 215 or the third control signaling) updating a C-DRX configuration 210 at the UE 115-*a* to enhance communications alignment between the UE 115-*a* and the base station 105-*a*. In such an example, the base station 105-*a* may switch to a second power saving mode and, as such, may transmit a control signal updating the C-DRX configuration 210 at the UE 115-*a* in accordance with the second power saving mode, for example, adjusting communication parameters that may affect synchronization between the base station 105-*a* and the UE 115-*a*.

Additionally or alternatively, the UE 115-*a* may be configured with a timeline where the UE 115-*a* may use the indicated C-DRX configuration in accordance with the timeline. The timeline may indicate an application time for the UE 115-*a* to apply the indicated C-DRX configuration to DRX communications. The timeline may be based on a timer, a number of slots, a number of spans, a number of symbols, or any other duration. In some cases, the base station 105-*a* may indicate the application time to the UE 115-*a* through RRC signaling (e.g., in the first control signaling 205), through the second control signaling 215, or any other message. Additionally or alternatively, the timeline may be based on a UE capability. That is, the UE 115-*a* may signal a UE capability to the base station 105-*a*, indicating at least a capability of the UE 115-*a* to use enhanced network power savings C-DRX configurations 210, a time switching capability (e.g., a time the UE 115-*a* may take to switch C-DRX configurations 210), or any other capability associated with C-DRX communications. Accordingly, the base station 105-*a* may modify and indicate the timeline to the UE 115-*a*. In some examples, the second control signaling 215 may UE-specific. For example, the second control signaling 215 may be a DCI, where the DCI may be a UE-specific DCI such as a DCI format 0_1 for physical uplink shared channel (PUSCH) scheduling, a DCI format 1_1 for physical downlink shared channel (PDSCH) scheduling, or another DCI message.

Additionally or alternatively, the UE 115-*a* may follow procedures specified for enhanced network power savings in accordance with the indicated C-DRX configuration 210. For example, the base station 105-*a* may configure the UE 115-*a* with a UE-specific C-DRX configuration associated with network power saving mode and the UE 115-*a* may be configured to follow procedures specified for enhanced network power savings. That is, receiving the second control signaling 215 may trigger the UE 115-*a* to turn on network power saving features. For example, the first control signaling 205 may indicate that the base station 105-*a* is using a subset of antenna ports for communications, such as switching from using 64 antenna ports to using 8 antenna ports. Accordingly, the UE 115-*a* may be configured to reduce a quantity of communication channels, data streams, or both to align with the subset of antenna ports at the base station 105-*a* in accordance with activating the network power saving features. In another example, the second control signaling 215 may indicate that the UE 115-*a* may perform and report channel measurements to the base station 105-*a*. For example, upon receiving the second control signaling 215, the UE 115-*a* may perform one or more channel measurements and may transmit a measurement report (e.g., a CSI report) to the base station 105-*a* including the channel measurements. Additional network power saving features may include reducing a number of active TRPs, a number of active communication beams, and any other modification to the network that may result in power savings. The UE 115-*a* may perform any procedures associated with activating network power savings features, for example, as signaled by the base station 105-*a*, predefined at the UE 115-*a*, or the like.

Further, the base station 105-*a* may serve more than one UE 115, and the base station 105-*a* may align the active durations of the UEs 115 by configuring the UEs 115 with the same C-DRX configuration 210 (or C-DRX configurations 210 with partially overlapping or fully overlapping inactive durations). That is, the base station 105-*a* may use a C-DRX configuration 210 to align communications with the UEs 115 and achieve network power savings. In some cases, the C-DRX configuration 210 may increase temporal alignment between the UEs 115 by setting an inactivity timer of the UEs 115 to a specific value (e.g., 0).

Configuring UEs 115 to use C-DRX configurations 210 that correspond to enhanced network power saving may result in enhanced system synchronization. For example, UEs 115 configured to use C-DRX configurations 210 associated with power saving at the network as described herein may align active DRX durations and active DTX durations with greater precision, increasing signal throughput, reducing system latency from misaligned communication intervals (e.g., active durations), and conserving communication resources such as power.

Figure 3:
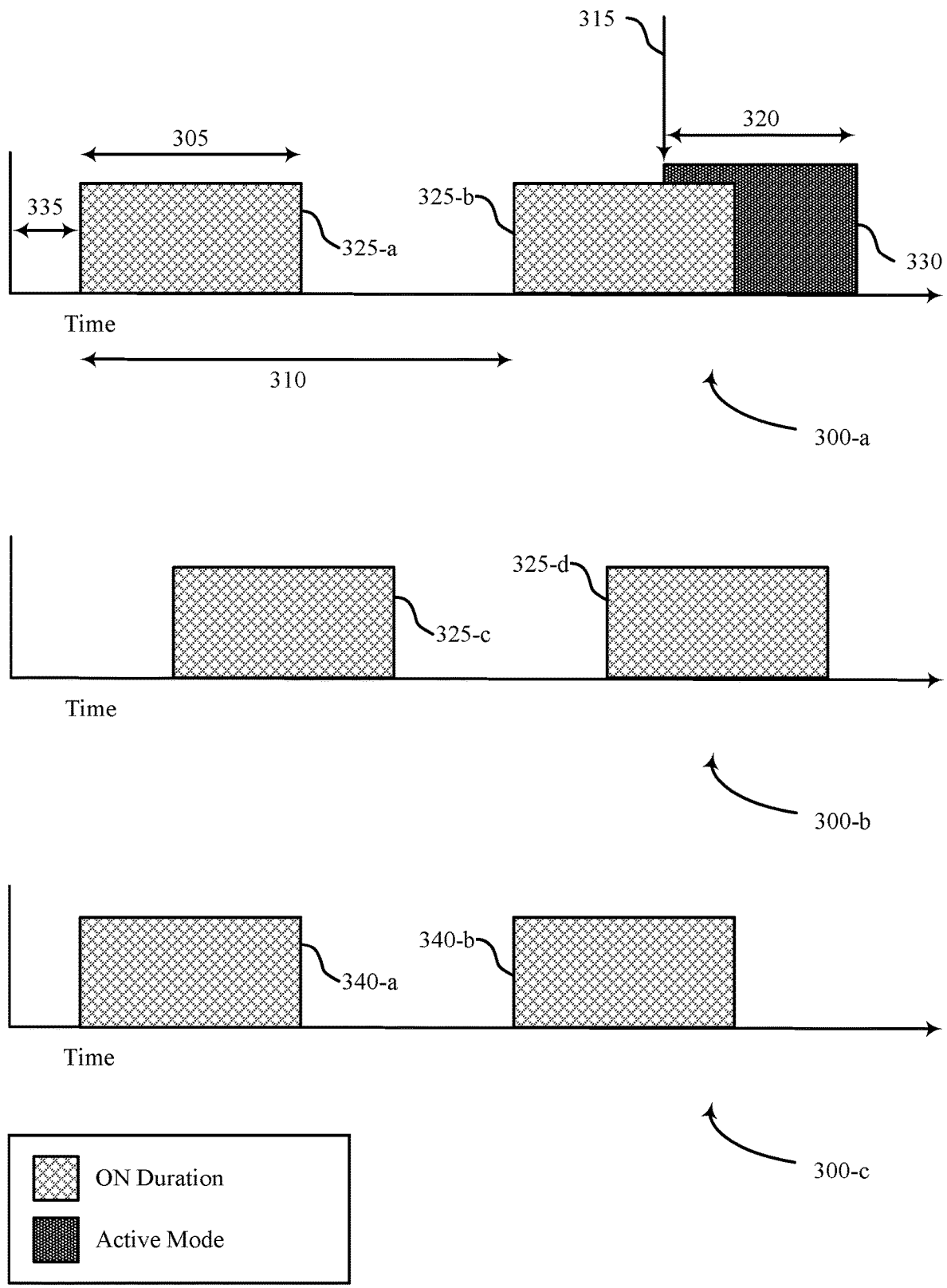
FIG. 3 illustrates examples of communications schemes that support dynamic C-DRX configuration supporting network power modes in accordance with aspects of the present disclosure.

FIG. 3 illustrates an example of communications schemes 300 that support dynamic C-DRX configuration supporting network power modes in accordance with aspects of the present disclosure. The communications schemes 300 may implement or be implemented by aspects of the wireless communications system 100 or the wireless communications system 200. For example, the communications schemes 300 may be implemented by a base station 105 or a UE 115, which may be examples of corresponding devices described with reference to FIGS. 1 and 2.

A base station 105 may configure a UE 115 with a DRX configuration (e.g., via RRC signaling) such as a C-DRX configuration 210 as described with reference to FIG. 2. For example, the base station 105 may configure the UE 115 with the DRX configuration associated with communications scheme 300-*a*. The DRX configuration may include an active duration 305, cycle durations 310, an inactivity timer 320, and a timing offset 335. The active duration 305 may refer to a time duration in which the UE 115 is configured to be in an active mode. The UE 115 may be configured to monitor a PDCCH during the active duration 305. In some cases, the active duration 305 may also be referred to as an ON duration, a DRX active time, or an active reception period, among other examples.

The cycle durations 310 may refer to a time period between active durations 305 of the UE 115. For example, a cycle duration 310-*a* may refer to a duration between a first time at which the UE 115 is configured to enter an active mode 325-*a* and a second time at which the UE 115 is configured to enter an active mode 325-*b*. Likewise, a cycle duration 310-*b* may refer to a duration between the second time at which the UE 115 is configured to enter the active mode 325-*b* and a third time at which the UE 115 is configured to enter an active mode 325-*c*. In some cases, the cycle durations 310 may also be referred to as DRX cycle durations, C-DRX cycle durations, or cycle lengths, among other examples. The active modes 325 may also be referred to as active reception modes, C-DRX modes, or DRX modes, among other examples.

The inactivity timer 320 may refer to a time duration for which the UE 115 is configured to remain in an active mode after receiving a PDCCH transmission. For example, the UE 115 may remain in an active mode 330 (e.g., for a time duration that corresponds to the inactivity timer 320) after receiving a PDCCH transmission 315 from the base station 105. In some cases, the inactivity timer 320 may also be referred to as a DRX inactivity timer. The timing offset 335 may refer to a time period between the beginning of a scheduling unit (e.g., frame, subframe, slot) and the first time at which the UE 115 is configured to enter the active mode 325-*a*. The timing offset 335 may also be referred to as an offset parameter or a frame offset, among other examples.

In accordance with the DRX configuration, the UE 115 may enter a sleep mode during periods of inactivity. For example, if the UE 115 is not configured to be in an active mode 325 and the inactivity timer 320 has expired (e.g., if the UE 115 has not recently received any PDCCH transmissions), the UE 115 may enter a sleep mode to conserve power. The UE 115 may remain in the sleep mode until the UE 115 is scheduled for communications or until the UE 115 is configured to return to an active mode 325. In some cases, the DRX configuration may be a UE-specific C-DRX configuration. In accordance with the UE-specific C-DRX configuration, the UE 115 may be in a connected mode (e.g., RRC connected) with the base station 105 even when the UE 115 is in a sleep mode.

In some cases, the base station 105 may communicate with more than one UE 115 and thus may configure different UEs 115 with different DRX configurations. For example, the base station 105 may configure a second UE 115 to with a DRX configuration according to communications scheme 300-*b*. In some examples, the DRX configuration associated with communications scheme 300-*a* and the DRX configuration associated with communications scheme 300-*b* may be different, resulting in a misalignment between UE 115 active modes 325. For example, the first UE 115 may be configured to monitor the PDCCH during active mode 325-*a* and active mode 325-*b* which may span time periods misaligned with active mode 325-*c* and active mode 325-*d* during which the second UE 115 may be configured to monitor the PDCCH. As such, the base station 105 may reduce a DTX period at the base station 105 due to the misaligned active modes 325 at the UEs 115 in cell coverage of the base stations 105.

In some cases, the base station 105 may experience improved power consumption if active durations 305 of the UEs 115 align with active DTX durations of the base station 105. For example, the base station 105 may be configured according to communication scheme 300-*c* (e.g., a DTX configuration). As such, the base station 105 may configure the UEs 115 such that the active modes 325 of the UEs 115 align with the active mode 340-*a* and 340-*b*. If the UEs 115 and the base station 105 are active in the same TTIs, the base station 105 may communicate with the UEs 115 in these TTIs and may enter a sleep mode in other TTIs (e.g., TTIs in which the UEs 115 and the base station 105 are in a sleep mode). In some cases, however, the UEs 115 may use C-DRX configurations not considering enhanced network power saving features (e.g., NR Green Network features) and as a result, the base station 105 may be active in more TTIs and may spend less time in sleep mode.

In accordance with the described techniques, the base station 105 may experience improved power savings by configuring UEs 115 with C-DRX configurations associated with a network power mode (e.g., base station 105-*a* low power mode). The C-DRX configuration may align active durations 305 of the UEs 115 with active durations 305 for other UEs 115, such that communications between the base station 105 and the UEs 115 are concentrated in the same time resources (e.g., slots, TTIs). Further, if the base station 105 provides service for multiple UEs 115, the base station may configure the UEs 115 with C-DRX configurations to align the active modes of the UEs 115. For example, the base station 105 may configure the UE 115 and the second UE 115 with respective DRX configurations that may synchronize active modes 325. As such, the base station 105 may align active modes 325 at the UEs 115 with active modes 340 at the base station 105, thereby aligning inactive periods and TTIs where the devices may enter sleep mode. As such, the base station 105 may remain in sleep mode for longer durations and may experience greater power savings, which may reduce overall network power consumption.

Figure 4:
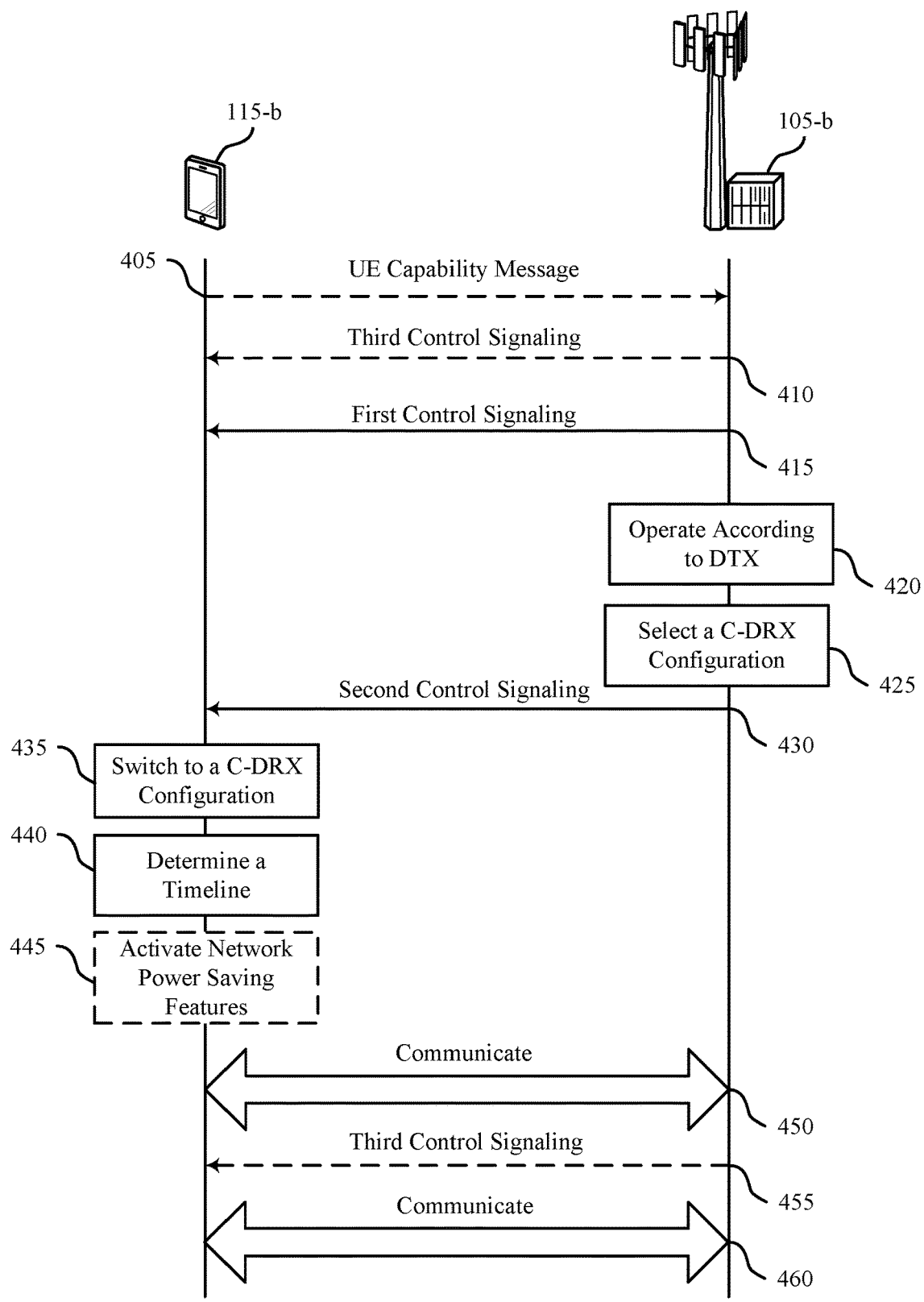
FIG. 4 illustrates an example of a process flow that supports dynamic C-DRX configuration supporting network power modes in accordance with aspects of the present disclosure.

FIG. 4 illustrates an example of a process flow 400 that supports dynamic C-DRX configuration supporting network power modes in accordance with aspects of the present disclosure. The process flow 400 may implement or be implemented by aspects of the wireless communications system 100 or the wireless communications system 200. For example, the process flow 400 may include a base station 105-*b* and a UE 115-*b*, which may be examples of corresponding devices described with reference to FIGS. 1 and 2. In the following description of the process flow 400, operations between the base station 105-*b* and the UE 115-*b* may be performed in a different order or at a different time than as shown. Additionally or alternatively, some operations may be omitted from the process flow 400, and other operations may be added to the process flow 400.

In some examples, at 405, the UE 115-*b* may transmit a UE capability message to the base station 105-*b* indicating a timeline. For example, the UE 115-*b* may take an amount of time to switch between C-DRX configurations and as such, the UE 115-*b* may signal such a switching time to the base station 105-*b* at least with reference to the timeline indication. The UE 115-*b* may include any type of capability within the UE capability message. For example, the UE 115-*b* may additionally or alternatively include a capability for the UE 115-*b* to switch between C-DRX configurations.

At 415, the base station 105-*b* may transmit and the UE 115-*b* may receive first control signaling (e.g., such as first control signaling 205 as described with reference to FIG. 2) configuring the UE 115-*b* with one or more C-DRX configurations, where each C-DRX configuration of the one or more C-DRX configurations may correspond to a respective network power mode. Including such C-DRX configurations corresponding to respective network power modes may support the base station 105-*b* dynamically configuring the UE 115-*b* (or any other UE 115) in accordance with the base station 105-*b* switching to an enhanced network power saving mode. In some examples, the base station 105-*b* may operate using a set of features currently active at the base station 105-*b* and according to a first network power mode at the base station 105-*b*. Operating using the set of features may include determining an active subset of TRPs of the base station 105-*b*, an active subset of communication beams of the base station 105-*b*, or both corresponding to the first network power mode. In such examples, communicating with the UE 115-*b* may include communicating with the UE 115-*b* using one or more TRPs of the active subset of TRPs, one or more communication beams of the active subset of communications, or both. In some examples, the first control signaling may include RRC signaling.

At 420, the base station 105-*b* may operate according to a DTX configuration, where an ON duration of the DTX configuration may be at least partially concurrent with an ON duration of one or more C-DRX configurations. In such examples, the base station 105-*b* may operate in a low power mode (e.g., in accordance with an enhanced network power savings mode as described herein). As such, at 425, the base station 105-*b* may select an indicated C-DRX configuration based on the DTX configuration, where the base station 105-*b* may transmit control signaling indicating the indicated C-DRX configuration.

At 430, the base station 105-*b* may transmit, and the UE 115-*b* may receive, second control signaling including an identifier indicating a C-DRX configuration, of the one or more C-DRX configurations, corresponding to the first network power mode at the base station 105-*b*, the first network power mode indicating the set of features currently active at the base station 105-*b*. For example, the first power mode may be an example of an enhanced network power savings mode where the base station 105-*b* and the UE 115-*b* may use a reduced number of TRPs, communication beams, data streams, and any other communication feature, as compared to operating according to the nominal network power mode.

Alternatively, the first power mode may be an example of a nominal network power mode, where the base station 105-*b* and the UE 115-*b* may use a number of TRPs, communication beams, and any other communication feature associated with nominal network power operations, for example, using the full subset of TRPs.

In some examples, at 410, the base station 105-*b* may transmit, and the UE 115-*b* may receive, third control signaling before the UE 115-*b* receives the first control signaling at 415, the third control signaling configuring the UE 115-*b* with a first set of C-DRX configurations, where the one or more C-DRX configurations includes a second set of C-DRX configurations, and where the first control signaling at 415 configures the UE 115-*b* with the second set of C-DRX configurations that is a subset of the first set of C-DRX configurations. That is, the third control signaling at 410 may be an example of an RRC message including multiple C-DRX configurations. For example, the third control signaling at 410 may include a first set of ten C-DRX configurations. As such, the first control signaling at 415 may include a second set of C-DRX configurations and may indicate a mapping of bit values from a set of bit values to respective C-DRX configurations of the second set of C-DRX configurations. For example, the first control signaling 415 may be a MAC-CE message and may include four C-DRX configurations and may include a mapping of bit values for each of the four C-DRX configurations. In other words, the first control signaling 415 may include a first bit value (e.g., "00") to a first C-DRX configuration, a second bit value (e.g., "01") to a second C-DRX configuration, a third bit value (e.g., "10") to a third C-DRX configuration, and a fourth bit value (e.g., "11") to a fourth C-DRX configuration. The quantity of C-DRX configurations in the second set of C-DRX configurations may be based on a size of the bit field. For example, the bit field may have two bits, supporting four distinguishable C-DRX configurations in the second set of C-DRX configurations. In some examples, the second control signaling at 430 may be a DCI message including an identifier pointing to a C-DRX configuration of the second set of C-DRX configurations. For example, the second control signaling at 430 may include an identifier (e.g., a configuration identifier 220 as described with reference to FIG. 2) including a bit field indicating a bit value of the set of bit values corresponding to the indicated C-DRX configuration according to the mapping in the first control signaling.

At 435, the UE 115-*b* may switch to a C-DRX configuration. For example, the UE 115-*b* may switch to the indicated C-DRX configuration after receiving the second control signaling according to a timeline, where communicating with the base station 105-*b* according to the indicated C-DRX configuration may be based on the switching.

That is, at 440, the UE 115-*b* may determine a timeline based on the first control signaling, the second control signaling, or both, such that after receiving the second control signaling, the UE 115-*b* may wait for a period of time (e.g., a number of TTIs, TTIs, slots, symbols, or any other time period) until switching to the indicated C-DRX configuration from the second control signaling. In some examples, the UE 115-*b* may determine an active time for the indicated C-DRX configuration based on the first control signaling, the second control signaling, or both, where communicating with the base station 105-*b* according to the indicated C-DRX configuration is further based on the active time. In other words, the active time may specify an amount of time that the UE 115-*b* may be configured to use the indicated C-DRX configuration before refraining from using the indicated C-DRX configuration. In some examples, the UE 115-*b* may determine a default C-DRX configuration based on the first control signaling, the second control signaling, or both, such that after the active time, the UE 115-*b* may switch to the default C-DRX configuration. Switching to the default C-DRX configuration may be based on determining the default C-DRX configuration. For example, the UE 115-*b* may be configured with an indicated C-DRX configuration from the second control signaling. After an active time where the UE 115-*b* uses the indicated C-DRX configuration, the UE 115-*b* may switch to the default C-DRX configuration as indicated in the first control signaling, the second control signaling, or both.

In some examples, at 445, the UE 115-*b* may activate one or more network power saving features at the UE 115-*b* based on the set of features currently active at the base station 105-*b* indicated by the first network power mode. For example, the UE 115-*b* may determine an active subset of TRPs of the base station 105-*b* corresponding to the first network power mode. In another example, the UE 115-*b* may determine an active subset of communication beams of the base station 105-*b* corresponding to the first network power mode. If the first network power mode is an enhanced power saving mode, the UE 115-*b* may activate the network power savings features accordingly. For example, the UE 115-*b* may reduce a number of TRPs, communication beams, data streams, or any other power consuming feature at the UE 115-*b*.

At 450, the base station 105-*b* and the UE 115-*b* may communicate. For example, the UE 115-*b* may communicate with the base station 105-*b* according to the indicated C-DRX configuration and based on the first network power mode (e.g., in accordance with a nominal operating mode, an enhanced power saving mode). In some examples, the UE 115-*b* may communicate with one or more TRPs of the active subset of TRPs in accordance with the first network power mode (e.g., using a nominal number of TRPs or a reduced number of TRPs). In some examples, the UE 115-*b* may communicate using one or more communication beams of the active subset of communication beams.

At 455, the base station 105-*b* may transmit, and the UE 115-*b* may receive, third control signaling including an identifier indicating a second C-DRX configuration of the one or more C-DRX configurations, the indicated second C-DRX configuration corresponding to a second network power mode at the base station 105-*b*. For example, the first network power mode may be an example of a nominal operating mode and the second network power mode may be an example of an enhanced power saving mode such that receiving the third control signaling may trigger the UE 115-*b* to switch DRX configurations from a DRX configuration associated with the nominal operating mode to a DRX configuration associated with the enhanced power saving mode. Accordingly, the UE 115-*b* may be configured to align active durations of DRX communications with DTX active durations at the base station 105-*b*.

At 460, the base station 105-*b* and the UE 115-*b* may communicate according to the indicated second C-DRX configuration and in accordance with the second network power mode. As such, the UE 115-*b* and the base station 105-*b* may experience enhanced network synchronization due to the alignment of ON periods (e.g., between DRX and DTX), increased power savings from dynamic signaling supporting the enhanced network power savings mode, and reduced system latency.

Figure 5:
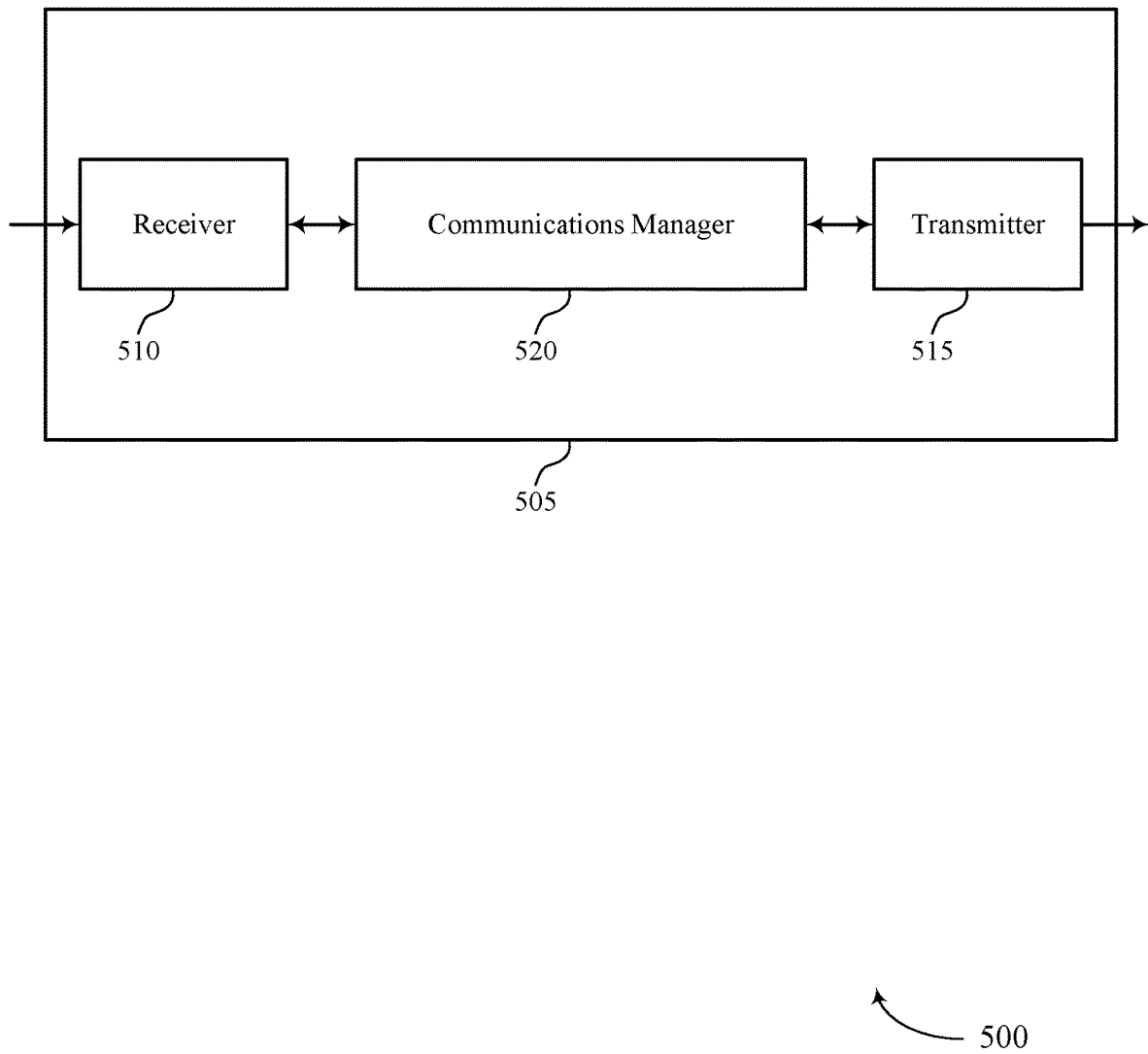
FIGS. 5 and 6 show block diagrams of devices that support dynamic C-DRX configuration supporting network power modes in accordance with aspects of the present disclosure.

FIG. 5 shows a block diagram 500 of a device 505 that supports dynamic C-DRX configuration supporting network power modes in accordance with aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to dynamic C-DRX configuration supporting network power modes). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to dynamic C-DRX configuration supporting network power modes). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of dynamic C-DRX configuration supporting network power modes as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 520 may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communications at a UE in accordance with examples as disclosed herein. For example, the communications manager 520 may be configured as or otherwise support a means for receiving first control signaling configuring the UE with a set of multiple C-DRX configurations, each C-DRX configuration of the set of multiple C-DRX configurations corresponding to a respective network power mode. The communications manager 520 may be configured as or otherwise support a means for receiving second control signaling including an identifier indicating a C-DRX configuration of the set of multiple C-DRX configurations corresponding to a first network power mode at a base station, the first network power mode indicating a set of features currently active at the base station. The communications manager 520 may be configured as or otherwise support a means for communicating with the base station according to the indicated C-DRX configuration and based on the first network power mode.

By including or configuring the communications manager 520 in accordance with examples as described herein, the device 505 (e.g., a processor controlling or otherwise coupled to the receiver 510, the transmitter 515, the communications manager 520, or a combination thereof) may support techniques for dynamically configuring a C-DRX configuration in accordance with switching a network power mode, resulting in higher transmission and reception throughput, enhanced utilization of communications resources, and lower latency.

Figure 6:
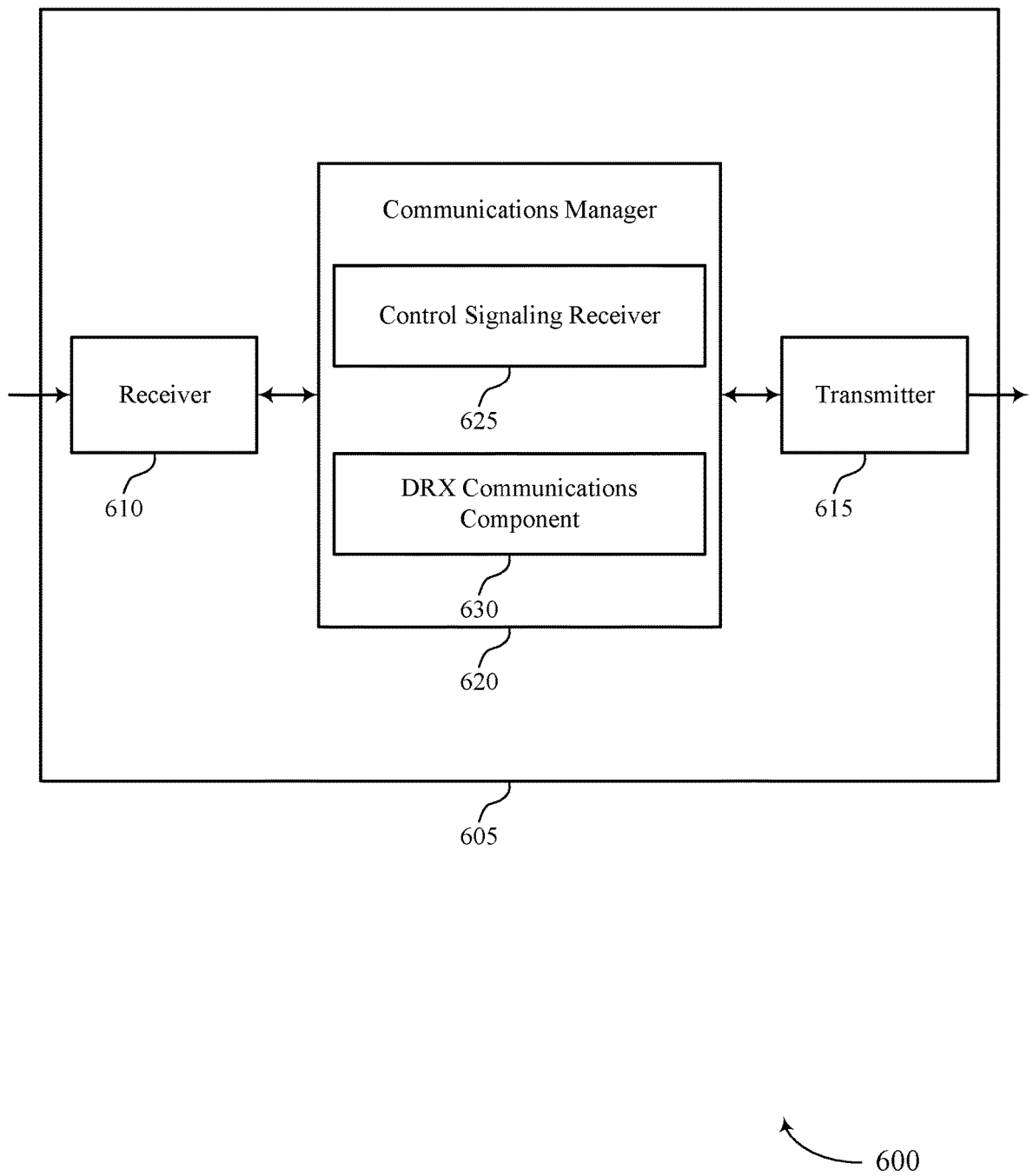

FIG. 6 shows a block diagram 600 of a device 605 that supports dynamic C-DRX configuration supporting network power modes in accordance with aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to dynamic C-DRX configuration supporting network power modes). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to dynamic C-DRX configuration supporting network power modes). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of dynamic C-DRX configuration supporting network power modes as described herein. For example, the communications manager 620 may include a control signaling receiver 625 a DRX communications component 630, or any combination thereof. The communications manager 620 may be an example of aspects of a communications manager 520 as described herein. In some examples, the communications manager 620, or various components thereof, may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a UE in accordance with examples as disclosed herein. The control signaling receiver 625 may be configured as or otherwise support a means for receiving first control signaling configuring the UE with a set of multiple C-DRX configurations, each C-DRX configuration of the set of multiple C-DRX configurations corresponding to a respective network power mode. The control signaling receiver 625 may be configured as or otherwise support a means for receiving second control signaling including an identifier indicating a C-DRX configuration of the set of multiple C-DRX configurations corresponding to a first network power mode at a base station, the first network power mode indicating a set of features currently active at the base station. The DRX communications component 630 may be configured as or otherwise support a means for communicating with the base station according to the indicated C-DRX configuration and based on the first network power mode.

Figure 7:
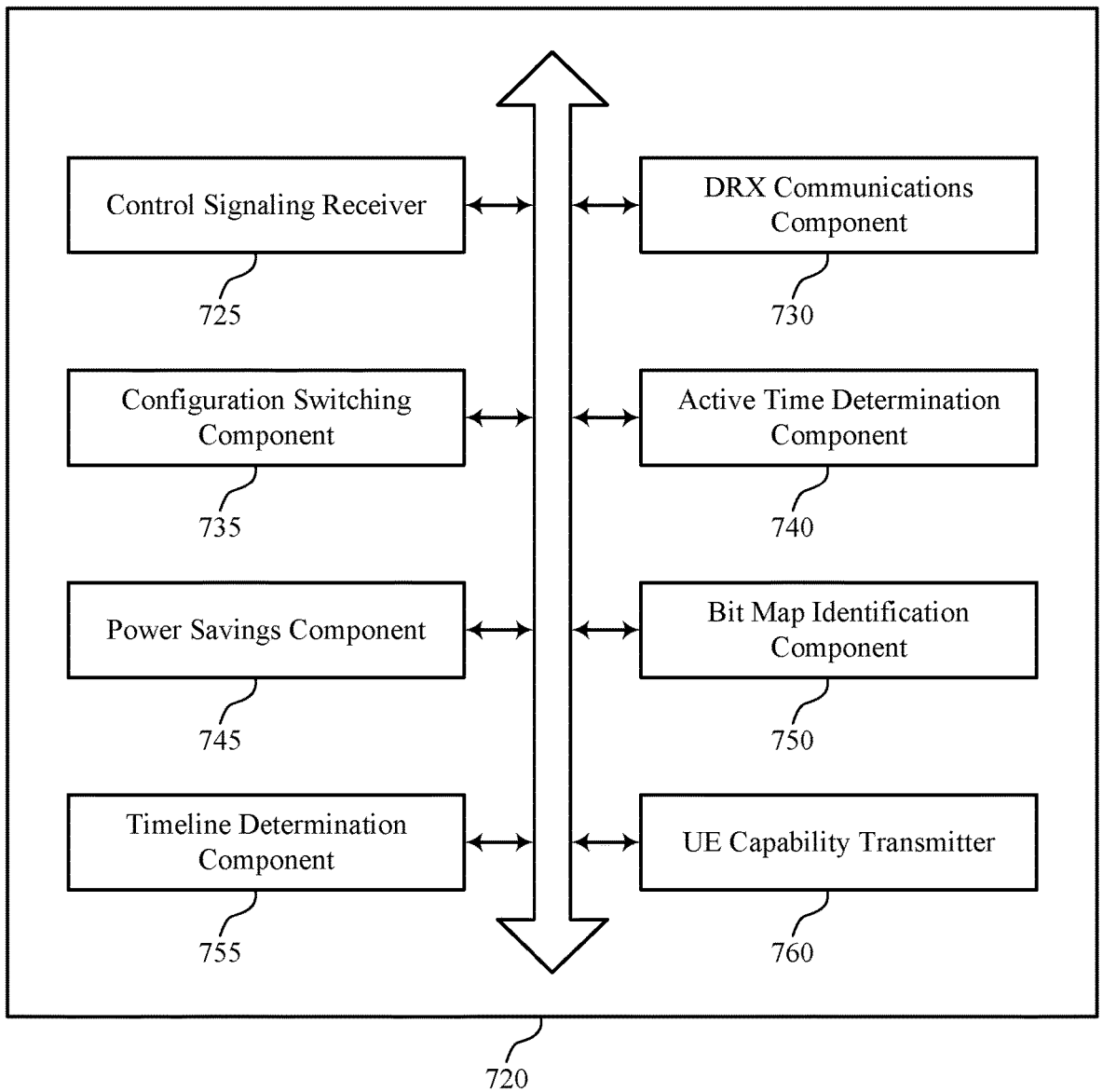
FIG. 7 shows a block diagram of a communications manager that supports dynamic C-DRX configuration supporting network power modes in accordance with aspects of the present disclosure.

FIG. 7 shows a block diagram 700 of a communications manager 720 that supports dynamic C-DRX configuration supporting network power modes in accordance with aspects of the present disclosure. The communications manager 720 may be an example of aspects of a communications manager 520, a communications manager 620, or both, as described herein. The communications manager 720, or various components thereof, may be an example of means for performing various aspects of dynamic C-DRX configuration supporting network power modes as described herein. For example, the communications manager 720 may include a control signaling receiver 725, a DRX communications component 730, a configuration switching component 735, an active time determination component 740, a power savings component 745, a bit map identification component 750, a timeline determination component 755, a UE capability transmitter 760, or any combination thereof. Each of these components may communicate, directly or indirectly, with one another (e.g., via one or more buses).

The communications manager 720 may support wireless communications at a UE in accordance with examples as disclosed herein. The control signaling receiver 725 may be configured as or otherwise support a means for receiving first control signaling configuring the UE with a set of multiple C-DRX configurations, each C-DRX configuration of the set of multiple C-DRX configurations corresponding to a respective network power mode. In some examples, the control signaling receiver 725 may be configured as or otherwise support a means for receiving second control signaling including an identifier indicating a C-DRX configuration of the set of multiple C-DRX configurations corresponding to a first network power mode at a base station, the first network power mode indicating a set of features currently active at the base station. The DRX communications component 730 may be configured as or otherwise support a means for communicating with the base station according to the indicated C-DRX configuration and based on the first network power mode.

In some examples, the control signaling receiver 725 may be configured as or otherwise support a means for receiving third control signaling before receiving the first control signaling, the third control signaling configuring the UE with a first set of multiple C-DRX configurations, where the set of multiple C-DRX configurations includes a second set of multiple C-DRX configurations, and where the first control signaling configures the UE with the second set of multiple C-DRX configurations that is a subset of the first set of multiple C-DRX configurations.

In some examples, the first control signaling indicates a mapping of bit values from a set of multiple bit values to respective C-DRX configurations of the second set of multiple C-DRX configurations. In some examples, the identifier of the second control signaling includes a bit field indicating a bit value of the set of multiple bit values corresponding to the indicated C-DRX configuration according to the mapping.

In some examples, a quantity of C-DRX configurations in the second set of multiple C-DRX configurations is based on a size of the bit field. In some examples, the third control signaling includes RRC signaling, the first control signaling includes a MAC-CE, and the second control signaling includes a DCI message.

In some examples, the first control signaling includes RRC signaling and the second control signaling includes a DCI message, a MAC-CE, or both.

In some examples, the configuration switching component 735 may be configured as or otherwise support a means for switching to the indicated C-DRX configuration after receiving the second control signaling according to a timeline, where communicating with the base station according to the indicated C-DRX configuration is based on the switching.

In some examples, the timeline determination component 755 may be configured as or otherwise support a means for determining the timeline based on the first control signaling, the second control signaling, or both, where switching to the indicated C-DRX configuration is based on determining the timeline.

In some examples, the UE capability transmitter 760 may be configured as or otherwise support a means for transmitting a UE capability message indicating the timeline, where switching to the indicated C-DRX configuration is based on the UE capability message indicating the timeline.

In some examples, the control signaling receiver 725 may be configured as or otherwise support a means for receiving third control signaling including a second identifier indicating a second C-DRX configuration of the set of multiple C-DRX configurations, the indicated second C-DRX configuration corresponding to a second network power mode at the base station. In some examples, the DRX communications component 730 may be configured as or otherwise support a means for communicating with the base station according to the indicated second C-DRX configuration and based on the second network power mode.

In some examples, the active time determination component 740 may be configured as or otherwise support a means for determining an active time for the indicated C-DRX configuration based on the first control signaling, the second control signaling, or both, where communicating with the base station according to the indicated C-DRX configuration is further based on the active time. In some examples, the configuration switching component 735 may be configured as or otherwise support a means for switching to a default C-DRX configuration after the active time.

In some examples, the configuration switching component 735 may be configured as or otherwise support a means for determining the default C-DRX configuration based on the first control signaling, where switching to the default C-DRX configuration is based on determining the default C-DRX configuration.

In some examples, the power savings component 745 may be configured as or otherwise support a means for activating one or more network power saving features at the UE based on the set of features currently active at the base station indicated by the first network power mode, where communicating with the base station according to the indicated C-DRX configuration is further based on the activated one or more network power saving features.

In some examples, to support communicating with the base station, the DRX communications component 730 may be configured as or otherwise support a means for determining an active subset of transmission reception points of the base station corresponding to the first network power mode. In some examples, to support communicating with the base station, the DRX communications component 730 may be configured as or otherwise support a means for communicating with one or more transmission reception points of the active subset of transmission reception points.

In some examples, to support communicating with the base station, the DRX communications component 730 may be configured as or otherwise support a means for determining an active subset of communication beams of the base station corresponding to the first network power mode. In some examples, to support communicating with the base station, the DRX communications component 730 may be configured as or otherwise support a means for communicating using one or more communication beams of the active subset of communication beams. In some examples, the first network power mode includes a nominal power mode or an enhanced power saving mode.

Figure 8:
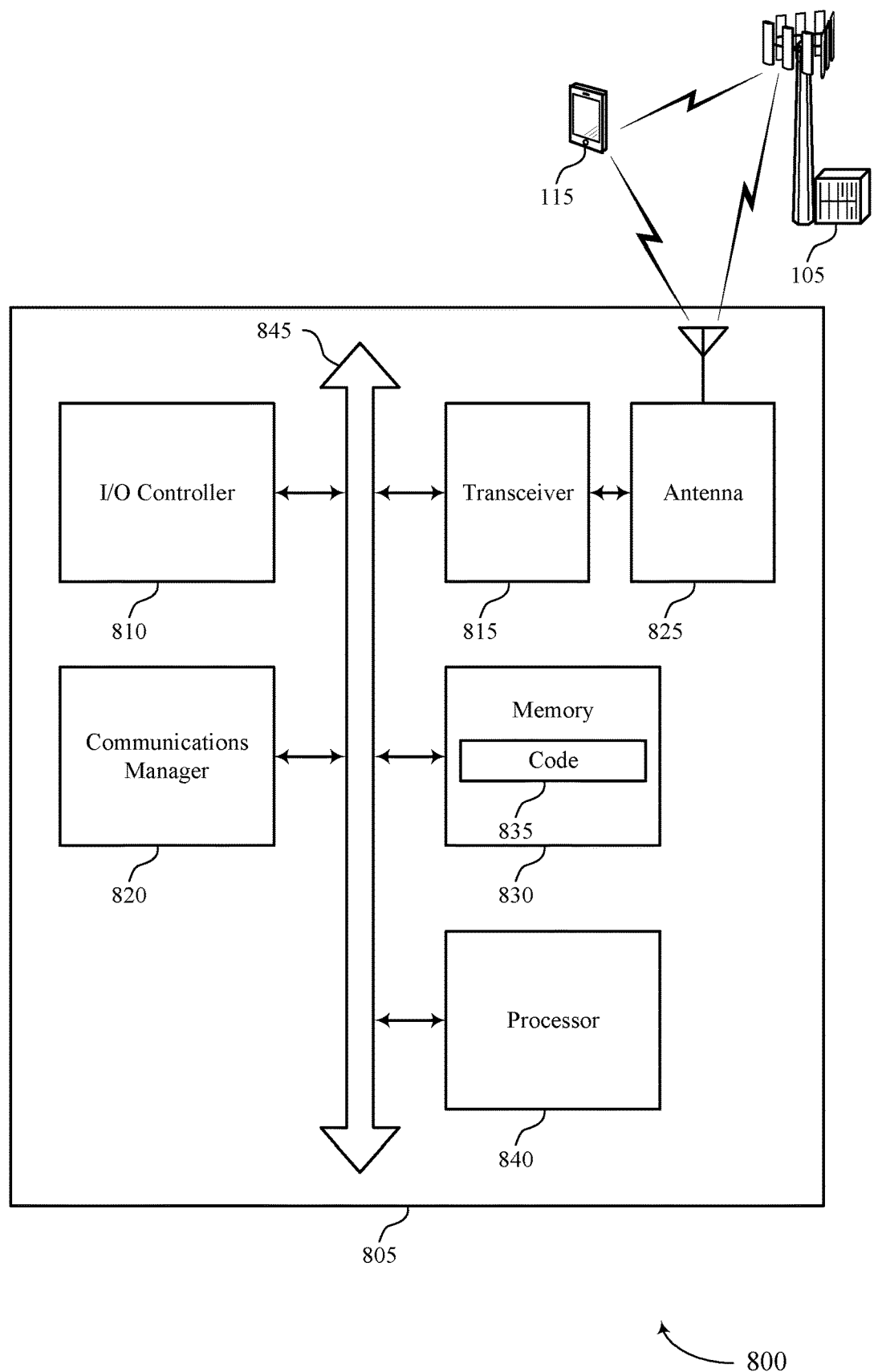
FIG. 8 shows a diagram of a system including a device that supports dynamic C-DRX configuration supporting network power modes in accordance with aspects of the present disclosure.

FIG. 8 shows a diagram of a system 800 including a device 805 that supports dynamic C-DRX configuration supporting network power modes in accordance with aspects of the present disclosure. The device 805 may be an example of or include the components of a device 505, a device 605, or a UE 115 as described herein. The device 805 may communicate wirelessly with one or more base stations 105, UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting dynamic C-DRX configuration supporting network power modes). For example, the device 805 or a component of the device 805 may include a processor 840 and memory 830 coupled to the processor 840, the processor 840 and memory 830 configured to perform various functions described herein.

The communications manager 820 may support wireless communications at a UE in accordance with examples as disclosed herein. For example, the communications manager 820 may be configured as or otherwise support a means for receiving first control signaling configuring the UE with a set of multiple C-DRX configurations, each C-DRX configuration of the set of multiple C-DRX configurations corresponding to a respective network power mode. The communications manager 820 may be configured as or otherwise support a means for receiving second control signaling including an identifier indicating a C-DRX configuration of the set of multiple C-DRX configurations corresponding to a first network power mode at a base station, the first network power mode indicating a set of features currently active at the base station. The communications manager 820 may be configured as or otherwise support a means for communicating with the base station according to the indicated C-DRX configuration and based on the first network power mode.

By including or configuring the communications manager 820 in accordance with examples as described herein, the device 805 may support techniques for dynamically configuring a C-DRX configuration in accordance with switching a network power mode, resulting in improved communication reliability, reduced latency, reduced power consumption, more efficient utilization of communication resources, improved coordination between devices, longer battery life, and improved utilization of processing capability.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of dynamic C-DRX configuration supporting network power modes as described herein, or the processor 840 and the memory 830 may be otherwise configured to perform or support such operations.

Figure 9:
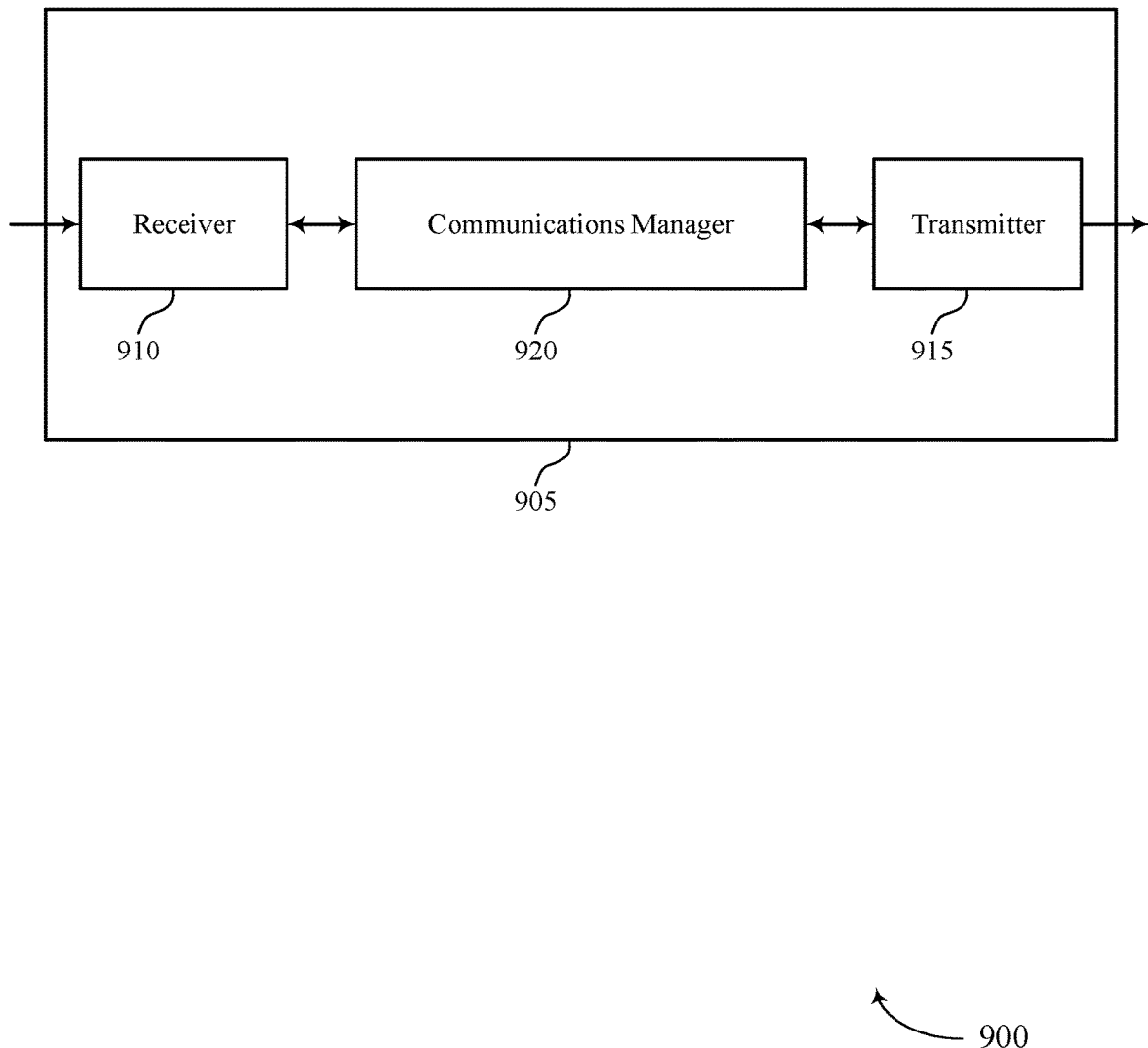
FIGS. 9 and 10 show block diagrams of devices that support dynamic C-DRX configuration supporting network power modes in accordance with aspects of the present disclosure.

FIG. 9 shows a block diagram 900 of a device 905 that supports dynamic C-DRX configuration supporting network power modes in accordance with aspects of the present disclosure. The device 905 may be an example of aspects of a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to dynamic C-DRX configuration supporting network power modes). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to dynamic C-DRX configuration supporting network power modes). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of dynamic C-DRX configuration supporting network power modes as described herein. For example, the communications manager 920, the receiver 910, the transmitter 915, or various combinations or components thereof may support a method for performing one or more of the functions described herein.

In some examples, the communications manager 920, the receiver 910, the transmitter 915, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 920, the receiver 910, the transmitter 915, or various combinations or components thereof may be implemented in code (e.g., as communications management software or firmware) executed by a processor. If implemented in code executed by a processor, the functions of the communications manager 920, the receiver 910, the transmitter 915, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 920 may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communications at a base station in accordance with examples as disclosed herein. For example, the communications manager 920 may be configured as or otherwise support a means for transmitting first control signaling configuring a UE with a set of multiple C-DRX configurations, each C-DRX configuration of the set of multiple C-DRX configurations corresponding to a respective network power mode. The communications manager 920 may be configured as or otherwise support a means for operating using a set of features currently active at the base station according to a first network power mode at the base station. The communications manager 920 may be configured as or otherwise support a means for transmitting, to the UE, second control signaling including an identifier indicating a C-DRX configuration of the set of multiple C-DRX configurations for the UE, the indicated C-DRX configuration corresponding to the first network power mode at the base station. The communications manager 920 may be configured as or otherwise support a means for communicating with the UE according to the indicated C-DRX configuration and based on the first network power mode.

By including or configuring the communications manager 920 in accordance with examples as described herein, the device 905 (e.g., a processor controlling or otherwise coupled to the receiver 910, the transmitter 915, the communications manager 920, or a combination thereof) may support techniques for dynamically configuring a C-DRX configuration in accordance with switching a network power mode, resulting in reduced processing, reduced power consumption, and more efficient utilization of communication resources.

Figure 10:
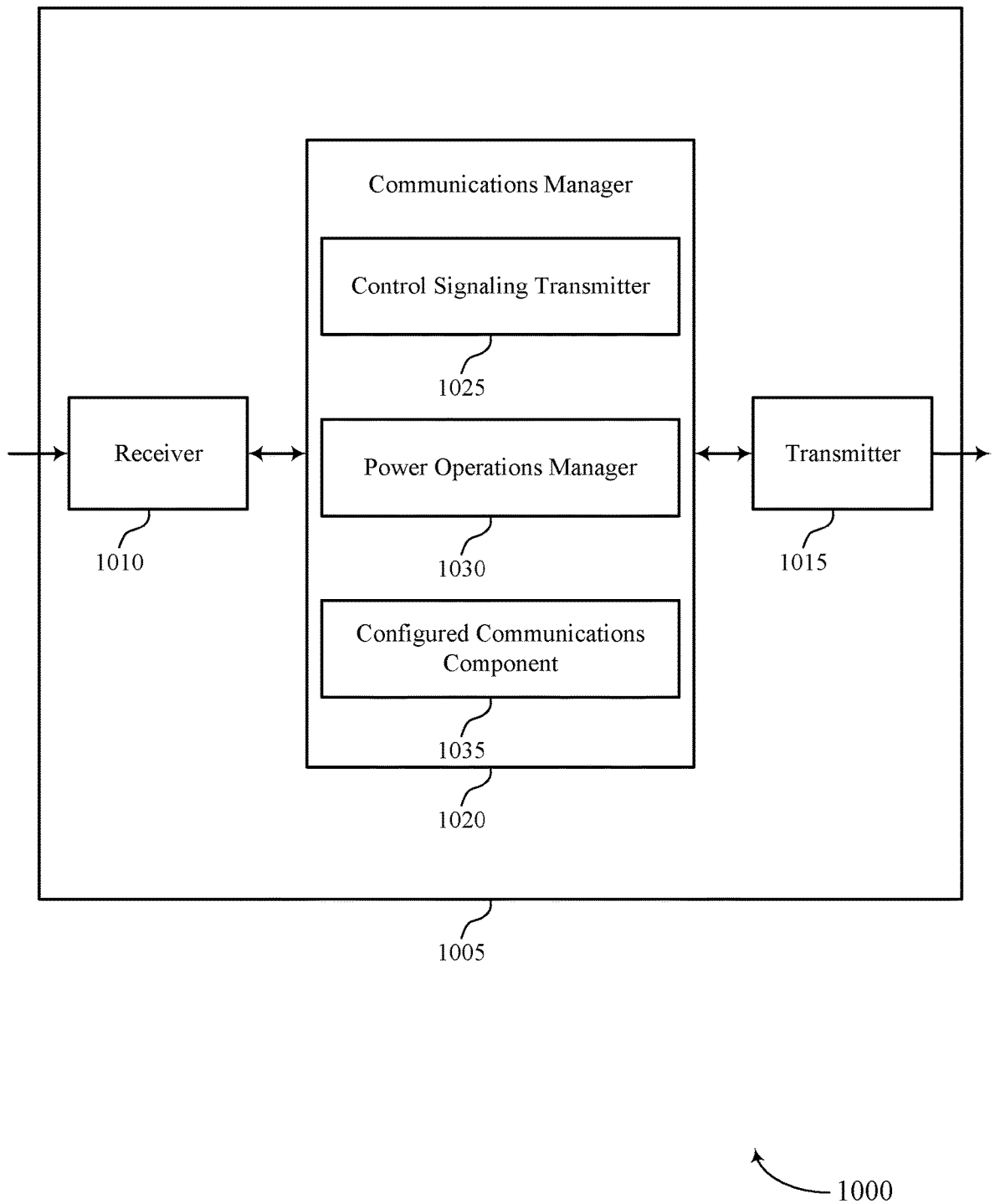

FIG. 10 shows a block diagram 1000 of a device 1005 that supports dynamic C-DRX configuration supporting network power modes in accordance with aspects of the present disclosure. The device 1005 may be an example of aspects of a device 905 or a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to dynamic C-DRX configuration supporting network power modes). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to dynamic C-DRX configuration supporting network power modes). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of dynamic C-DRX configuration supporting network power modes as described herein. For example, the communications manager 1020 may include a control signaling transmitter 1025, a power operations manager 1030, a configured communications component 1035, or any combination thereof. The communications manager 1020 may be an example of aspects of a communications manager 920 as described herein. In some examples, the communications manager 1020, or various components thereof, may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a base station in accordance with examples as disclosed herein. The control signaling transmitter 1025 may be configured as or otherwise support a means for transmitting first control signaling configuring a UE with a set of multiple C-DRX configurations, each C-DRX configuration of the set of multiple C-DRX configurations corresponding to a respective network power mode. The power operations manager 1030 may be configured as or otherwise support a means for operating using a set of features currently active at the base station according to a first network power mode at the base station. The control signaling transmitter 1025 may be configured as or otherwise support a means for transmitting, to the UE, second control signaling including an identifier indicating a C-DRX configuration of the set of multiple C-DRX configurations for the UE, the indicated C-DRX configuration corresponding to the first network power mode at the base station. The configured communications component 1035 may be configured as or otherwise support a means for communicating with the UE according to the indicated C-DRX configuration and based on the first network power mode.

Figure 11:
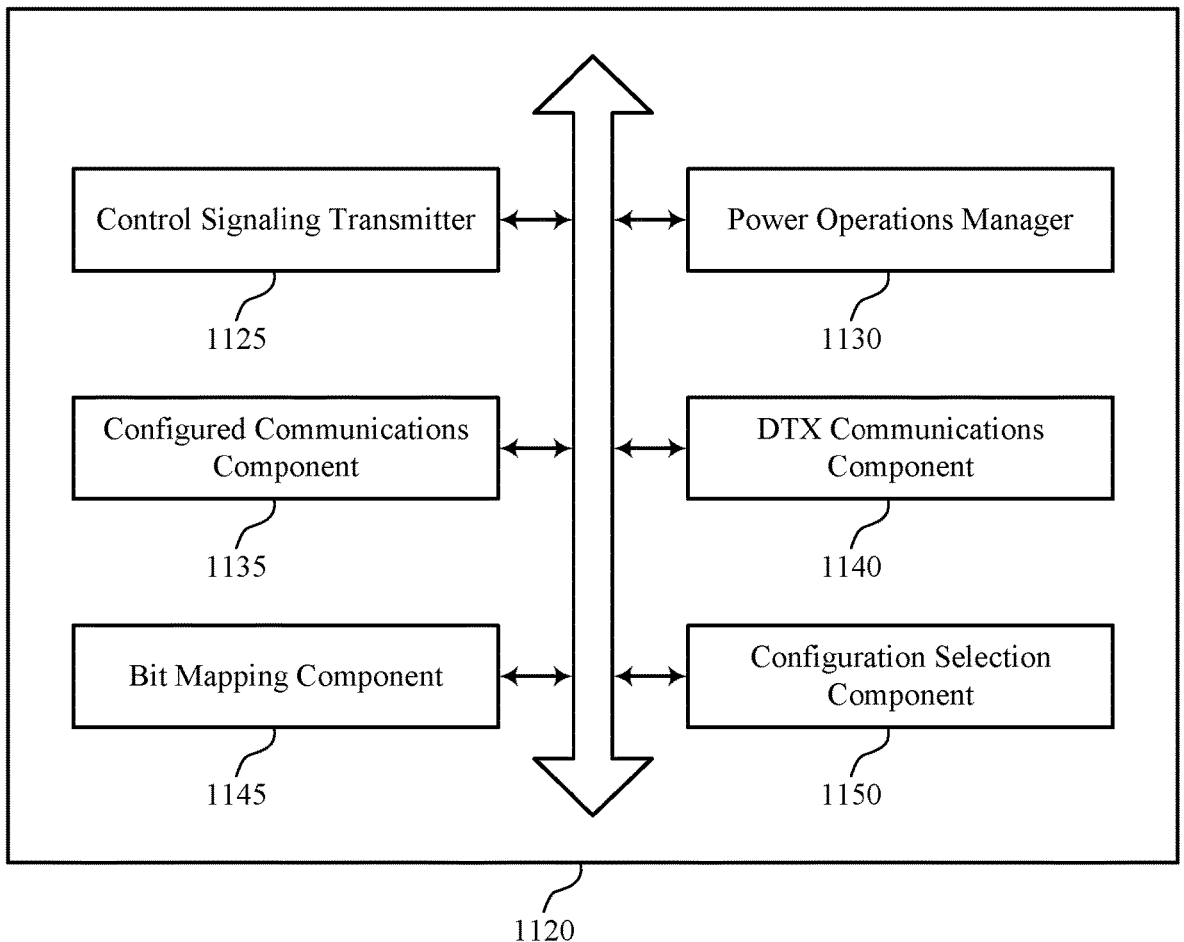
FIG. 11 shows a block diagram of a communications manager that supports dynamic C-DRX configuration supporting network power modes in accordance with aspects of the present disclosure.

FIG. 11 shows a block diagram 1100 of a communications manager 1120 that supports dynamic C-DRX configuration supporting network power modes in accordance with aspects of the present disclosure. The communications manager 1120 may be an example of aspects of a communications manager 920, a communications manager 1020, or both, as described herein. The communications manager 1120, or various components thereof, may be an example of means for performing various aspects of dynamic C-DRX configuration supporting network power modes as described herein. For example, the communications manager 1120 may include a control signaling transmitter 1125, a power operations manager 1130, a configured communications component 1135, a DTX communications component 1140, a bit mapping component 1145, a configuration selection component 1150, or any combination thereof. Each of these components may communicate, directly or indirectly, with one another (e.g., via one or more buses).

The communications manager 1120 may support wireless communications at a base station in accordance with examples as disclosed herein. The control signaling transmitter 1125 may be configured as or otherwise support a means for transmitting first control signaling configuring a UE with a set of multiple C-DRX configurations, each C-DRX configuration of the set of multiple C-DRX configurations corresponding to a respective network power mode. The power operations manager 1130 may be configured as or otherwise support a means for operating using a set of features currently active at the base station according to a first network power mode at the base station. In some examples, the control signaling transmitter 1125 may be configured as or otherwise support a means for transmitting, to the UE, second control signaling including an identifier indicating a C-DRX configuration of the set of multiple C-DRX configurations for the UE, the indicated C-DRX configuration corresponding to the first network power mode at the base station. The configured communications component 1135 may be configured as or otherwise support a means for communicating with the UE according to the indicated C-DRX configuration and based on the first network power mode.

In some examples, the control signaling transmitter 1125 may be configured as or otherwise support a means for transmitting third control signaling before transmitting the first control signaling, the third control signaling configuring the UE with a first set of multiple C-DRX configurations, where the set of multiple C-DRX configurations includes a second set of multiple C-DRX configurations and the first control signaling configures the UE with the second set of multiple C-DRX configurations that is a subset of the first set of multiple C-DRX configurations.

In some examples, the first control signaling indicates a mapping of bit values from a set of multiple bit values to respective C-DRX configurations of the second set of multiple C-DRX configurations. In some examples, the identifier of the second control signaling includes a bit field indicating a bit value of the set of multiple bit values corresponding to the indicated C-DRX configuration according to the mapping.

In some examples, the configuration selection component 1150 may be configured as or otherwise support a means for selecting the second set of multiple C-DRX configurations based on a quantity of C-DRX configurations supported by the second control signaling according to a size of the bit field.

In some examples, the third control signaling includes RRC signaling, the first control signaling includes a MAC-CE, and the second control signaling includes a DCI message.

In some examples, the first control signaling includes RRC signaling and the second control signaling includes a DCI message, a MAC-CE, or both.

In some examples, the DTX communications component 1140 may be configured as or otherwise support a means for operating according to a discontinuous transmission configuration, where an on duration of the discontinuous transmission configuration is at least partially concurrent with an on duration of the indicated C-DRX configuration.

In some examples, the DTX communications component 1140 may be configured as or otherwise support a means for selecting the indicated C-DRX configuration based on the discontinuous transmission configuration, where transmitting the second control signaling is based on the selecting.

In some examples, the power operations manager 1130 may be configured as or otherwise support a means for switching to a second network power mode at the base station different from the first network power mode. In some examples, the power operations manager 1130 may be configured as or otherwise support a means for activating one or more first features at the base station, deactivating one or more second features at the base station, or both based on the set of features currently active at the base station and the second network power mode. In some examples, the control signaling transmitter 1125 may be configured as or otherwise support a means for transmitting, to the UE, third control signaling including a second identifier indicating a second C-DRX configuration of the set of multiple C-DRX configurations for the UE, the indicated second C-DRX configuration corresponding to the second network power mode at the base station.

In some examples, the power operations manager 1130 may be configured as or otherwise support a means for triggering the switching to the second network power mode based on a change in UE traffic at the base station, a change in one or more channel metrics at the base station, or a combination thereof.

In some examples, to support operating using the set of features currently active at the base station, the DTX communications component 1140 may be configured as or otherwise support a means for determining an active subset of transmission reception points of the base station, an active subset of communication beams of the base station, or both corresponding to the first network power mode, where communicating with the UE includes communicating with the UE using one or more transmission reception points of the active subset of transmission reception points, one or more communication beams of the active subset of communication beams, or both.

Figure 12:
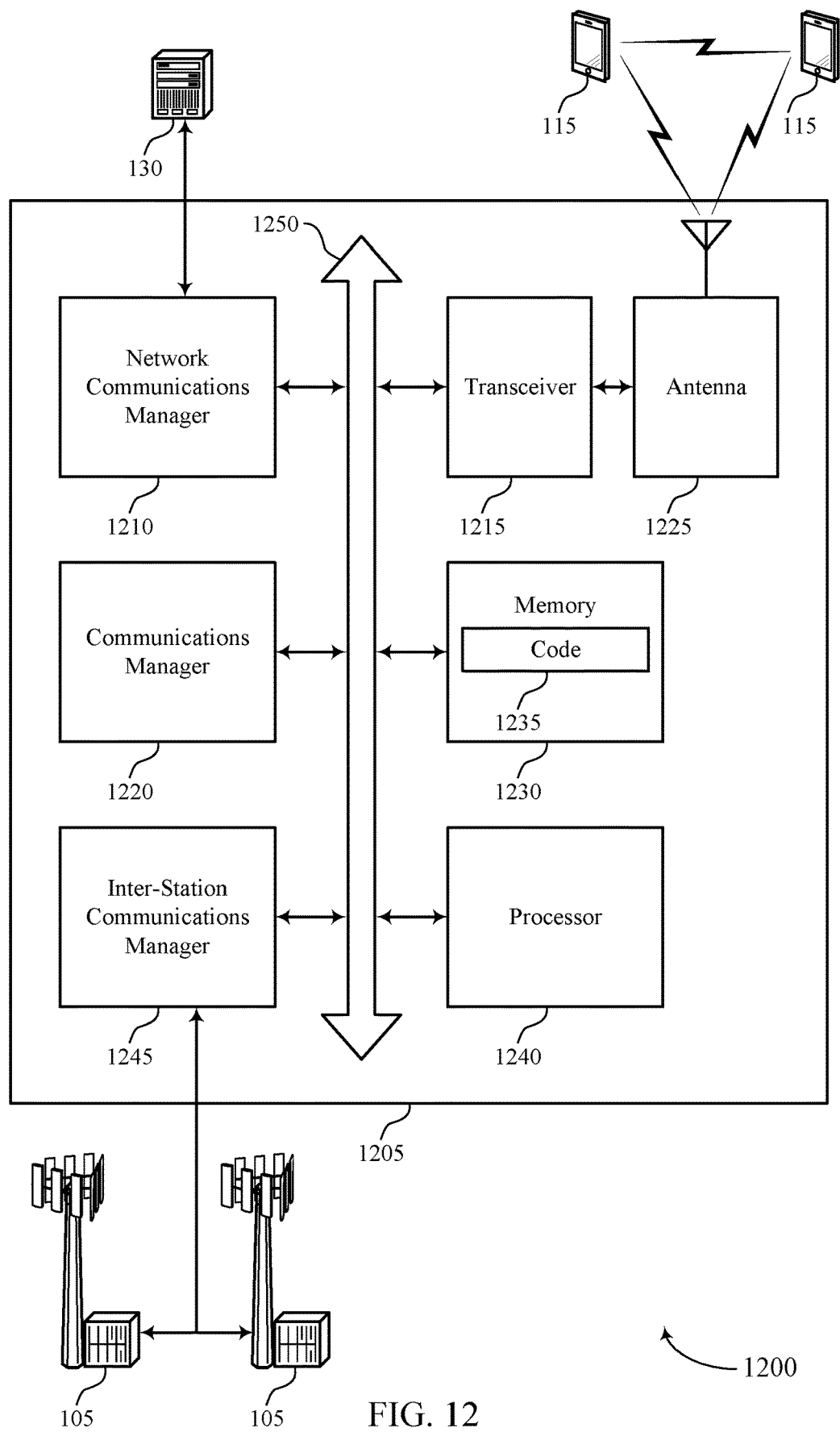
FIG. 12 shows a diagram of a system including a device that supports dynamic C-DRX configuration supporting network power modes in accordance with aspects of the present disclosure.

FIG. 12 shows a diagram of a system 1200 including a device 1205 that supports dynamic C-DRX configuration supporting network power modes in accordance with aspects of the present disclosure. The device 1205 may be an example of or include the components of a device 905, a device 1005, or a base station 105 as described herein. The device 1205 may communicate wirelessly with one or more base stations 105, UEs 115, or any combination thereof. The device 1205 may include components for bi-directional voice and data communications including components for transmitting and receiving communications, such as a communications manager 1220, a network communications manager 1210, a transceiver 1215, an antenna 1225, a memory 1230, code 1235, a processor 1240, and an inter-station communications manager 1245. These components may be in electronic communication or otherwise coupled (e.g., operatively, communicatively, functionally, electronically, electrically) via one or more buses (e.g., a bus 1250).

The network communications manager 1210 may manage communications with a core network 130 (e.g., via one or more wired backhaul links). For example, the network communications manager 1210 may manage the transfer of data communications for client devices, such as one or more UEs 115.

In some cases, the device 1205 may include a single antenna 1225. However, in some other cases the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The memory 1230 may include RAM and ROM. The memory 1230 may store computer-readable, computer-executable code 1235 including instructions that, when executed by the processor 1240, cause the device 1205 to perform various functions described herein. The code 1235 may be stored in a non-transitory computer-readable medium such as system memory or another type of memory. In some cases, the code 1235 may not be directly executable by the processor 1240 but may cause a computer (e.g., when compiled and executed) to perform functions described herein. In some cases, the memory 1230 may contain, among other things, a BIOS which may control basic hardware or software operation such as the interaction with peripheral components or devices.

The processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some other cases, a memory controller may be integrated into the processor 1240. The processor 1240 may be configured to execute computer-readable instructions stored in a memory (e.g., the memory 1230) to cause the device 1205 to perform various functions (e.g., functions or tasks supporting dynamic C-DRX configuration supporting network power modes). For example, the device 1205 or a component of the device 1205 may include a processor 1240 and memory 1230 coupled to the processor 1240, the processor 1240 and memory 1230 configured to perform various functions described herein.

The inter-station communications manager 1245 may manage communications with other base stations 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communications network technology to provide communication between base stations 105.

The communications manager 1220 may support wireless communications at a base station in accordance with examples as disclosed herein. For example, the communications manager 1220 may be configured as or otherwise support a means for transmitting first control signaling configuring a UE with a set of multiple C-DRX configurations, each C-DRX configuration of the set of multiple C-DRX configurations corresponding to a respective network power mode. The communications manager 1220 may be configured as or otherwise support a means for operating using a set of features currently active at the base station according to a first network power mode at the base station. The communications manager 1220 may be configured as or otherwise support a means for transmitting, to the UE, second control signaling including an identifier indicating a C-DRX configuration of the set of multiple C-DRX configurations for the UE, the indicated C-DRX configuration corresponding to the first network power mode at the base station. The communications manager 1220 may be configured as or otherwise support a means for communicating with the UE according to the indicated C-DRX configuration and based on the first network power mode.

By including or configuring the communications manager 1220 in accordance with examples as described herein, the device 1205 may support techniques for dynamically configuring a C-DRX configuration in accordance with switching a network power mode, resulting in improved communication reliability, reduced latency, reduced power consumption, more efficient utilization of communication resources, improved coordination between devices, longer battery life, improved utilization of processing capability.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the processor 1240, the memory 1230, the code 1235, or any combination thereof. For example, the code 1235 may include instructions executable by the processor 1240 to cause the device 1205 to perform various aspects of dynamic C-DRX configuration supporting network power modes as described herein, or the processor 1240 and the memory 1230 may be otherwise configured to perform or support such operations.

Figure 13:
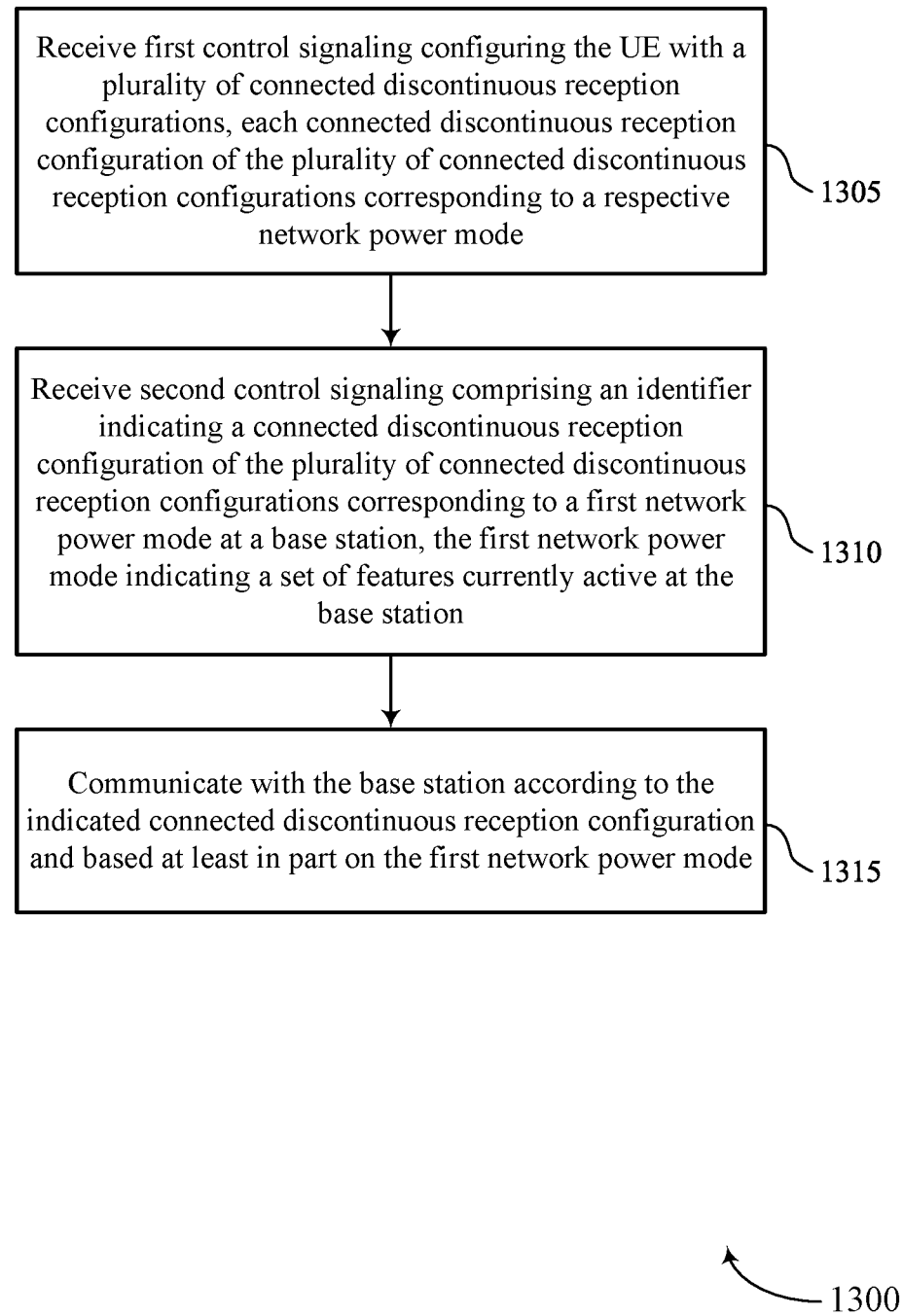
FIGS. 13 through 18 show flowcharts illustrating methods that support dynamic C-DRX configuration supporting network power modes in accordance with aspects of the present disclosure.

FIG. 13 shows a flowchart illustrating a method 1300 that supports dynamic C-DRX configuration supporting network power modes in accordance with aspects of the present disclosure. The operations of the method 1300 may be implemented by a UE or its components as described herein. For example, the operations of the method 1300 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1305, the method may include receiving first control signaling configuring the UE with a set of multiple C-DRX configurations, each C-DRX configuration of the set of multiple C-DRX configurations corresponding to a respective network power mode. The operations of 1305 may be performed in accordance with examples as disclosed herein. In some examples, aspects of the operations of 1305 may be performed by a control signaling receiver 725 as described with reference to FIG. 7.

At 1310, the method may include receiving second control signaling including an identifier indicating a C-DRX configuration of the set of multiple C-DRX configurations corresponding to a first network power mode at a base station, the first network power mode indicating a set of features currently active at the base station. The operations of 1310 may be performed in accordance with examples as disclosed herein. In some examples, aspects of the operations of 1310 may be performed by a control signaling receiver 725 as described with reference to FIG. 7.

At 1315, the method may include communicating with the base station according to the indicated C-DRX configuration and based on the first network power mode. The operations of 1315 may be performed in accordance with examples as disclosed herein. In some examples, aspects of the operations of 1315 may be performed by a DRX communications component 730 as described with reference to FIG. 7.

Figure 14:
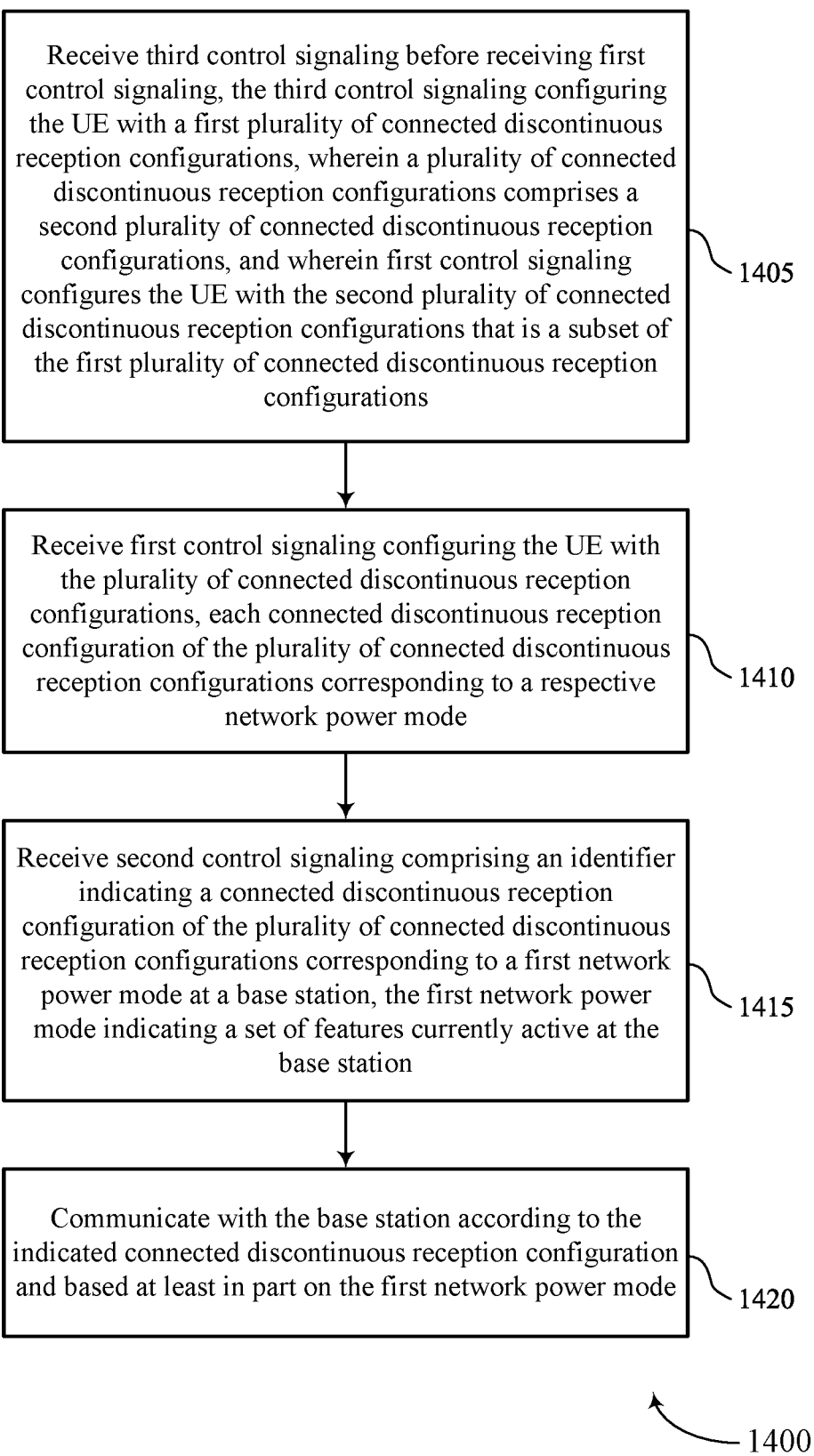

FIG. 14 shows a flowchart illustrating a method 1400 that supports dynamic C-DRX configuration supporting network power modes in accordance with aspects of the present disclosure. The operations of the method 1400 may be implemented by a UE or its components as described herein. For example, the operations of the method 1400 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1405, the method may include receiving third control signaling before receiving first control signaling, the third control signaling configuring the UE with a first set of multiple C-DRX configurations, where the set of multiple C-DRX configurations includes a second set of multiple C-DRX configurations, and where first control signaling configures the UE with the second set of multiple C-DRX configurations that is a subset of the first set of multiple C-DRX configurations. The operations of 1405 may be performed in accordance with examples as disclosed herein. In some examples, aspects of the operations of 1405 may be performed by a control signaling receiver 725 as described with reference to FIG. 7.

At 1410, the method may include receiving first control signaling configuring the UE with a set of multiple C-DRX configurations, each C-DRX configuration of the set of multiple C-DRX configurations corresponding to a respective network power mode. The operations of 1410 may be performed in accordance with examples as disclosed herein. In some examples, aspects of the operations of 1410 may be performed by a control signaling receiver 725 as described with reference to FIG. 7.

At 1415, the method may include receiving second control signaling including an identifier indicating a C-DRX configuration of the set of multiple C-DRX configurations corresponding to a first network power mode at a base station, the first network power mode indicating a set of features currently active at the base station. The operations of 1415 may be performed in accordance with examples as disclosed herein. In some examples, aspects of the operations of 1415 may be performed by a control signaling receiver 725 as described with reference to FIG. 7.

At 1420, the method may include communicating with the base station according to the indicated C-DRX configuration and based on the first network power mode. The operations of 1420 may be performed in accordance with examples as disclosed herein. In some examples, aspects of the operations of 1420 may be performed by a DRX communications component 730 as described with reference to FIG. 7.

Figure 15:
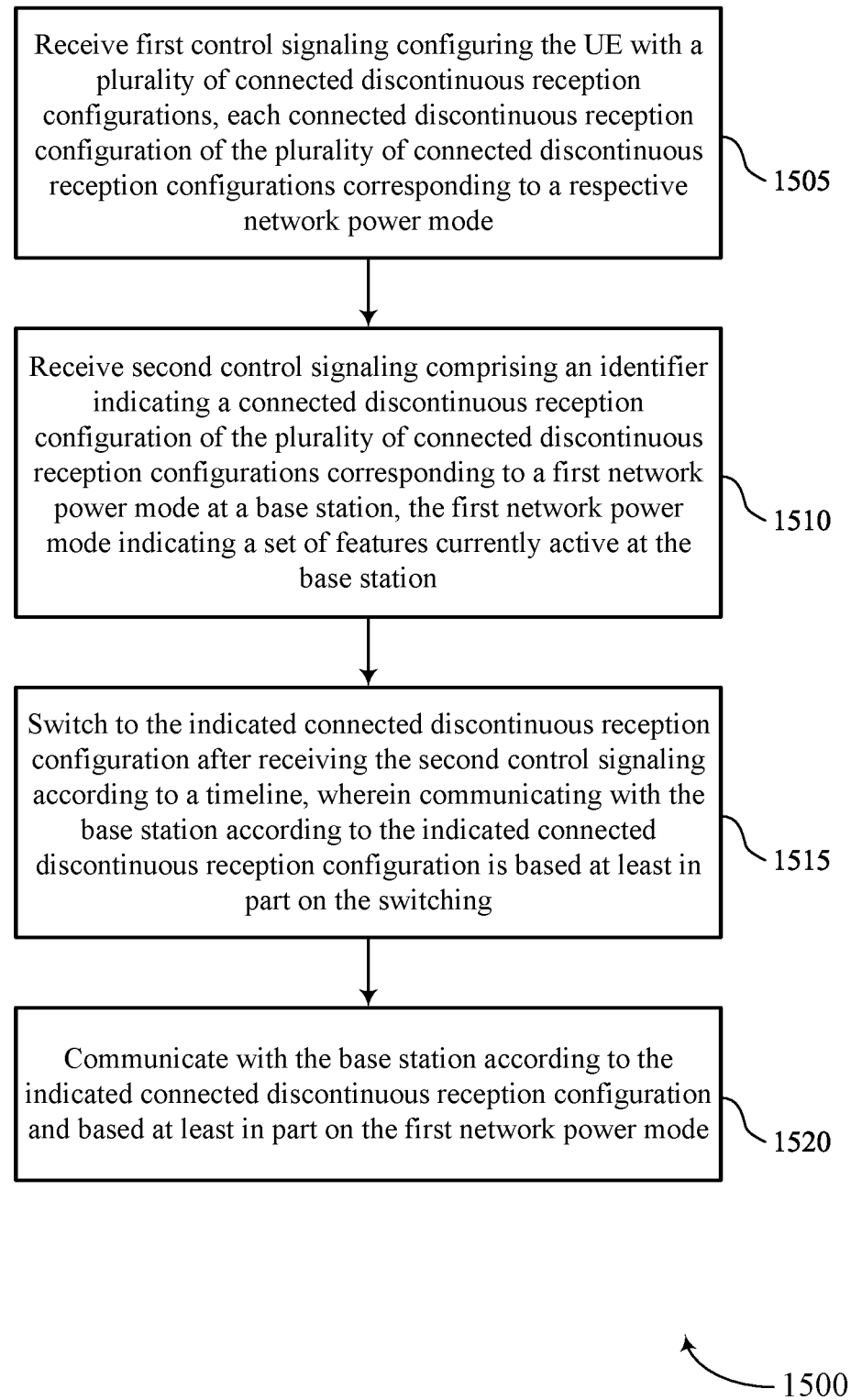

FIG. 15 shows a flowchart illustrating a method 1500 that supports dynamic C-DRX configuration supporting network power modes in accordance with aspects of the present disclosure. The operations of the method 1500 may be implemented by a UE or its components as described herein. For example, the operations of the method 1500 may be performed by a UE 115 as described with reference to FIGS. 1 through 8. In some examples, a UE may execute a set of instructions to control the functional elements of the UE to perform the described functions. Additionally or alternatively, the UE may perform aspects of the described functions using special-purpose hardware.

At 1505, the method may include receiving first control signaling configuring the UE with a set of multiple C-DRX configurations, each C-DRX configuration of the set of multiple C-DRX configurations corresponding to a respective network power mode. The operations of 1505 may be performed in accordance with examples as disclosed herein. In some examples, aspects of the operations of 1505 may be performed by a control signaling receiver 725 as described with reference to FIG. 7.

At 1510, the method may include receiving second control signaling including an identifier indicating a C-DRX configuration of the set of multiple C-DRX configurations corresponding to a first network power mode at a base station, the first network power mode indicating a set of features currently active at the base station. The operations of 1510 may be performed in accordance with examples as disclosed herein. In some examples, aspects of the operations of 1510 may be performed by a control signaling receiver 725 as described with reference to FIG. 7.

At 1515, the method may include switching to the indicated C-DRX configuration after receiving the second control signaling according to a timeline, where communicating with the base station according to the indicated C-DRX configuration is based on the switching. The operations of 1515 may be performed in accordance with examples as disclosed herein. In some examples, aspects of the operations of 1515 may be performed by a configuration switching component 735 as described with reference to FIG. 7.

At 1520, the method may include communicating with the base station according to the indicated C-DRX configuration and based on the first network power mode. The operations of 1520 may be performed in accordance with examples as disclosed herein. In some examples, aspects of the operations of 1520 may be performed by a DRX communications component 730 as described with reference to FIG. 7.

Figure 16:
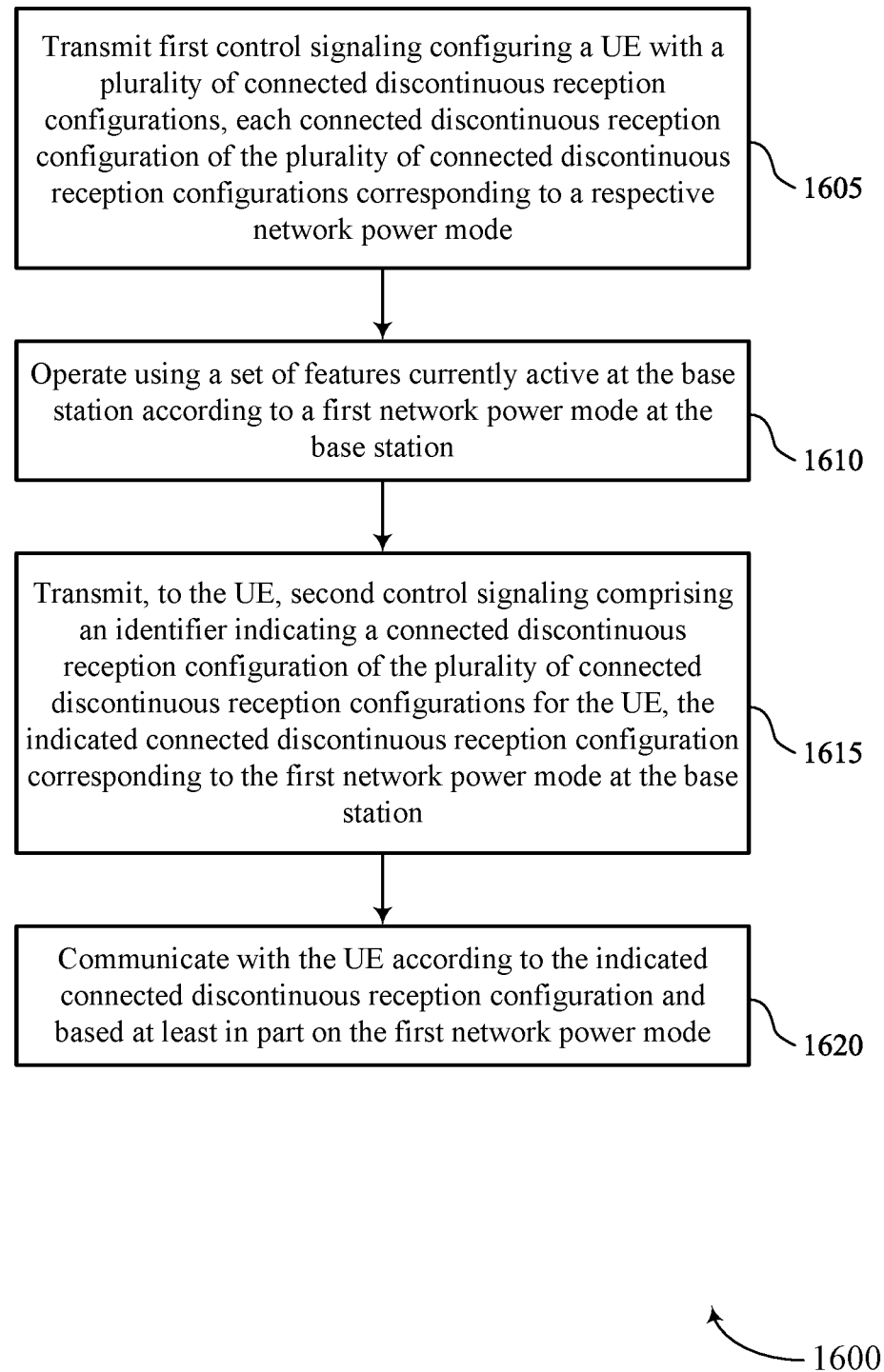

FIG. 16 shows a flowchart illustrating a method 1600 that supports dynamic C-DRX configuration supporting network power modes in accordance with aspects of the present disclosure. The operations of the method 1600 may be implemented by a base station or its components as described herein. For example, the operations of the method 1600 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1605, the method may include transmitting first control signaling configuring a UE with a set of multiple C-DRX configurations, each C-DRX configuration of the set of multiple C-DRX configurations corresponding to a respective network power mode. The operations of 1605 may be performed in accordance with examples as disclosed herein. In some examples, aspects of the operations of 1605 may be performed by a control signaling transmitter 1125 as described with reference to FIG. 11.

At 1610, the method may include operating using a set of features currently active at the base station according to a first network power mode at the base station. The operations of 1610 may be performed in accordance with examples as disclosed herein. In some examples, aspects of the operations of 1610 may be performed by a power operations manager 1130 as described with reference to FIG. 11.

At 1615, the method may include transmitting, to the UE, second control signaling including an identifier indicating a C-DRX configuration of the set of multiple C-DRX configurations for the UE, the indicated C-DRX configuration corresponding to the first network power mode at the base station. The operations of 1615 may be performed in accordance with examples as disclosed herein. In some examples, aspects of the operations of 1615 may be performed by a control signaling transmitter 1125 as described with reference to FIG. 11.

At 1620, the method may include communicating with the UE according to the indicated C-DRX configuration and based on the first network power mode. The operations of 1620 may be performed in accordance with examples as disclosed herein. In some examples, aspects of the operations of 1620 may be performed by a configured communications component 1135 as described with reference to FIG. 11.

Figure 17:
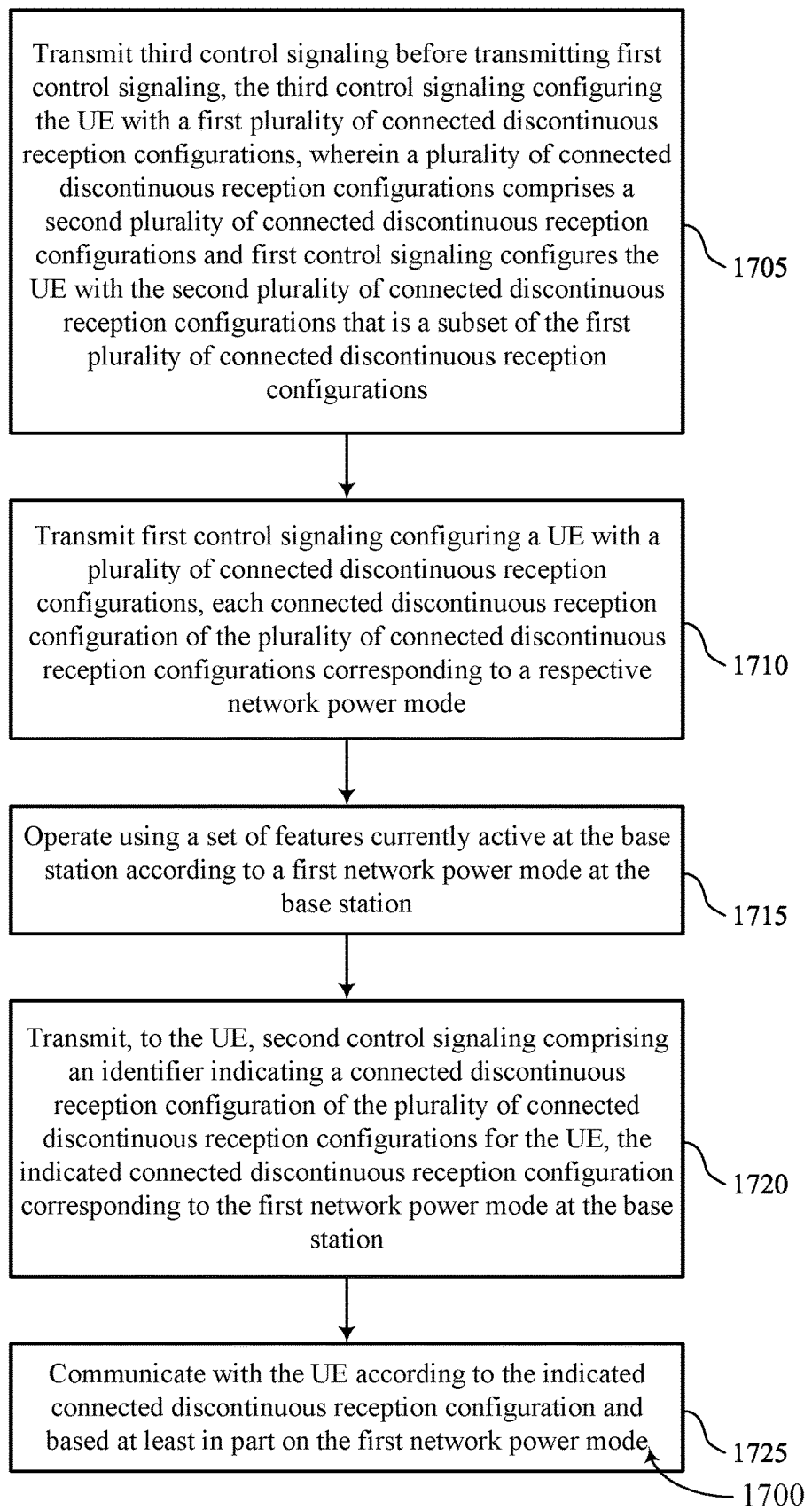

FIG. 17 shows a flowchart illustrating a method 1700 that supports dynamic C-DRX configuration supporting network power modes in accordance with aspects of the present disclosure. The operations of the method 1700 may be implemented by a base station or its components as described herein. For example, the operations of the method 1700 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1705, the method may include transmitting third control signaling before transmitting first control signaling, the third control signaling configuring the UE with a first set of multiple C-DRX configurations, where the set of multiple C-DRX configurations includes a second set of multiple C-DRX configurations and first control signaling configures the UE with the second set of multiple C-DRX configurations that is a subset of the first set of multiple C-DRX configurations. The operations of 1705 may be performed in accordance with examples as disclosed herein. In some examples, aspects of the operations of 1705 may be performed by a control signaling transmitter 1125 as described with reference to FIG. 11.

At 1710, the method may include transmitting first control signaling configuring a UE with a set of multiple C-DRX configurations, each C-DRX configuration of the set of multiple C-DRX configurations corresponding to a respective network power mode. The operations of 1710 may be performed in accordance with examples as disclosed herein. In some examples, aspects of the operations of 1710 may be performed by a control signaling transmitter 1125 as described with reference to FIG. 11.

At 1715, the method may include operating using a set of features currently active at the base station according to a first network power mode at the base station. The operations of 1715 may be performed in accordance with examples as disclosed herein. In some examples, aspects of the operations of 1715 may be performed by a power operations manager 1130 as described with reference to FIG. 11.

At 1720, the method may include transmitting, to the UE, second control signaling including an identifier indicating a C-DRX configuration of the set of multiple C-DRX configurations for the UE, the indicated C-DRX configuration corresponding to the first network power mode at the base station. The operations of 1720 may be performed in accordance with examples as disclosed herein. In some examples, aspects of the operations of 1720 may be performed by a control signaling transmitter 1125 as described with reference to FIG. 11.

At 1725, the method may include communicating with the UE according to the indicated C-DRX configuration and based on the first network power mode. The operations of 1725 may be performed in accordance with examples as disclosed herein. In some examples, aspects of the operations of 1725 may be performed by a configured communications component 1135 as described with reference to FIG. 11.

Figure 18:
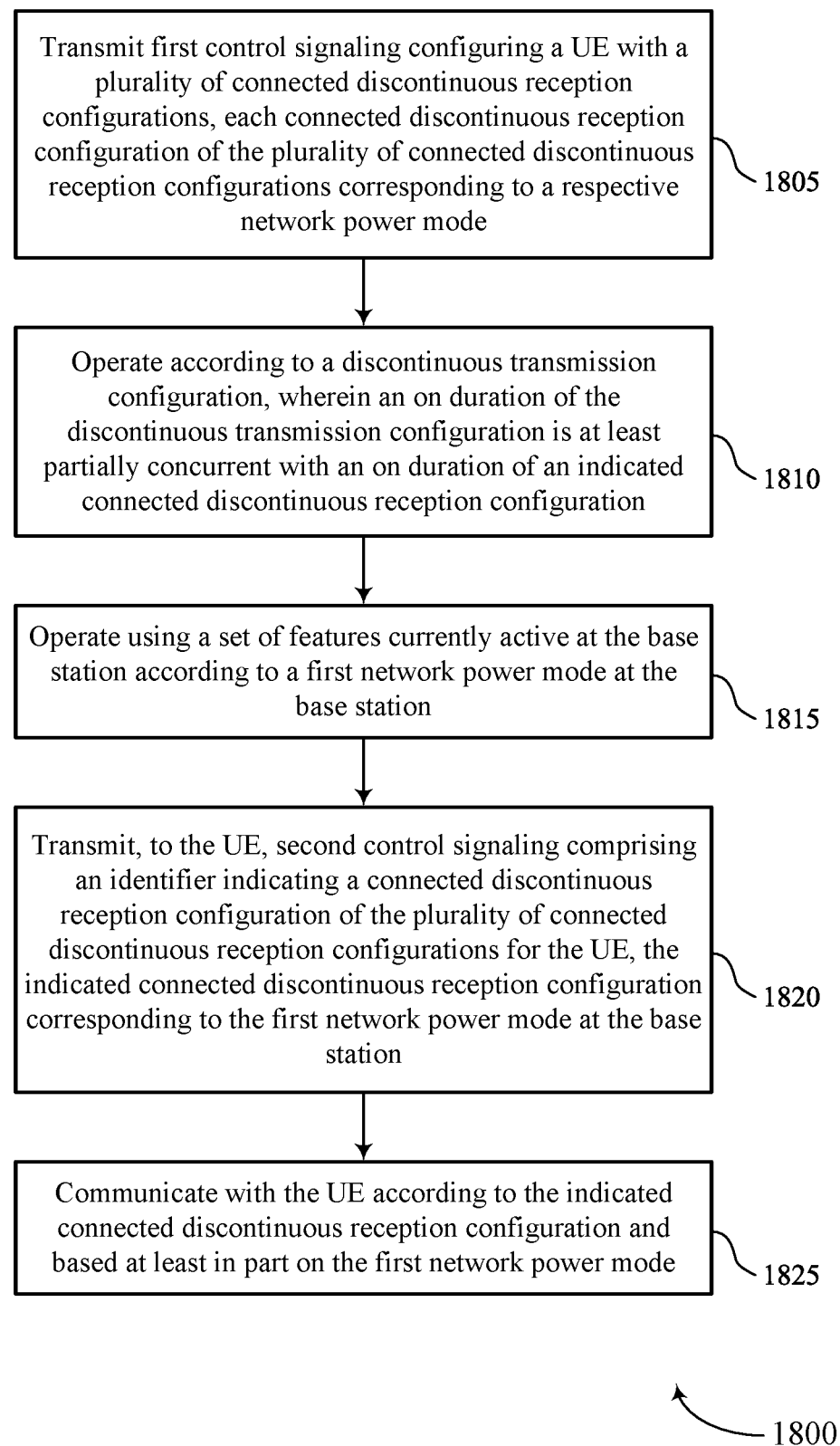

FIG. 18 shows a flowchart illustrating a method 1800 that supports dynamic C-DRX configuration supporting network power modes in accordance with aspects of the present disclosure. The operations of the method 1800 may be implemented by a base station or its components as described herein. For example, the operations of the method 1800 may be performed by a base station 105 as described with reference to FIGS. 1 through 4 and 9 through 12. In some examples, a base station may execute a set of instructions to control the functional elements of the base station to perform the described functions. Additionally or alternatively, the base station may perform aspects of the described functions using special-purpose hardware.

At 1805, the method may include transmitting first control signaling configuring a UE with a set of multiple C-DRX configurations, each C-DRX configuration of the set of multiple C-DRX configurations corresponding to a respective network power mode. The operations of 1805 may be performed in accordance with examples as disclosed herein. In some examples, aspects of the operations of 1805 may be performed by a control signaling transmitter 1125 as described with reference to FIG. 11.

At 1810, the method may include operating according to a DTX configuration, where an on duration of the discontinuous transmission configuration is at least partially concurrent with an on duration of the indicated C-DRX configuration. The operations of 1810 may be performed in accordance with examples as disclosed herein. In some examples, aspects of the operations of 1810 may be performed by a DTX communications component 1140 as described with reference to FIG. 11.

At 1815, the method may include operating using a set of features currently active at the base station according to a first network power mode at the base station. The operations of 1815 may be performed in accordance with examples as disclosed herein. In some examples, aspects of the operations of 1815 may be performed by a power operations manager 1130 as described with reference to FIG. 11.

At 1820, the method may include transmitting, to the UE, second control signaling including an identifier indicating a C-DRX configuration of the set of multiple C-DRX configurations for the UE, the indicated C-DRX configuration corresponding to the first network power mode at the base station. The operations of 1820 may be performed in accordance with examples as disclosed herein. In some examples, aspects of the operations of 1820 may be performed by a control signaling transmitter 1125 as described with reference to FIG. 11.

At 1825, the method may include communicating with the UE according to the indicated C-DRX configuration and based on the first network power mode. The operations of 1825 may be performed in accordance with examples as disclosed herein. In some examples, aspects of the operations of 1825 may be performed by a configured communications component 1135 as described with reference to FIG. 11.

The following provides an overview of aspects of the present disclosure:

Aspect 1: A method for wireless communications at a UE, comprising: receiving first control signaling configuring the UE with a plurality of connected discontinuous reception configurations, each connected discontinuous reception configuration of the plurality of connected discontinuous reception configurations corresponding to a respective network power mode; receiving second control signaling comprising an identifier indicating a connected discontinuous reception configuration of the plurality of connected discontinuous reception configurations corresponding to a first network power mode at a base station, the first network power mode indicating a set of features currently active at the base station; and communicating with the base station according to the indicated connected discontinuous reception configuration and based at least in part on the first network power mode.

Aspect 2: The method of aspect 1, further comprising: receiving third control signaling before receiving the first control signaling, the third control signaling configuring the UE with a first plurality of connected discontinuous reception configurations, wherein the plurality of connected discontinuous reception configurations comprises a second plurality of connected discontinuous reception configurations, and wherein the first control signaling configures the UE with the second plurality of connected discontinuous reception configurations that is a subset of the first plurality of connected discontinuous reception configurations.

Aspect 3: The method of aspect 2, wherein the first control signaling indicates a mapping of bit values from a plurality of bit values to respective connected discontinuous reception configurations of the second plurality of connected discontinuous reception configurations; and the identifier of the second control signaling comprises a bit field indicating a bit value of the plurality of bit values corresponding to the indicated connected discontinuous reception configuration according to the mapping.

Aspect 4: The method of aspect 3, wherein a quantity of connected discontinuous reception configurations in the second plurality of connected discontinuous reception configurations is based at least in part on a size of the bit field.

Aspect 5: The method of any of aspects 2 through 4, wherein the third control signaling comprises radio resource control signaling, the first control signaling comprises a medium access control element, and the second control signaling comprises a downlink control information message.

Aspect 6: The method of any of aspects 1 through 5, wherein the first control signaling comprises radio resource control signaling and the second control signaling comprises a downlink control information message, a medium access control element, or both.

Aspect 7: The method of any of aspects 1 through 6, further comprising: switching to the indicated connected discontinuous reception configuration after receiving the second control signaling according to a timeline, wherein communicating with the base station according to the indicated connected discontinuous reception configuration is based at least in part on the switching.

Aspect 8: The method of aspect 7, further comprising: determining the timeline based at least in part on the first control signaling, the second control signaling, or both, wherein switching to the indicated connected discontinuous reception configuration is based at least in part on determining the timeline.

Aspect 9: The method of any of aspects 7 through 8, further comprising: transmitting a UE capability message indicating the timeline, wherein switching to the indicated connected discontinuous reception configuration is based at least in part on the UE capability message indicating the timeline.

Aspect 10: The method of any of aspects 1 through 9, further comprising: receiving third control signaling comprising a second identifier indicating a second connected discontinuous reception configuration of the plurality of connected discontinuous reception configurations, the indicated second connected discontinuous reception configuration corresponding to a second network power mode at the base station; and communicating with the base station according to the indicated second connected discontinuous reception configuration and based at least in part on the second network power mode.

Aspect 11: The method of any of aspects 1 through 10, further comprising: determining an active time for the indicated connected discontinuous reception configuration based at least in part on the first control signaling, the second control signaling, or both, wherein communicating with the base station according to the indicated connected discontinuous reception configuration is further based at least in part on the active time; and switching to a default connected discontinuous reception configuration after the active time.

Aspect 12: The method of aspect 11, further comprising: determining the default connected discontinuous reception configuration based at least in part on the first control signaling, wherein switching to the default connected discontinuous reception configuration is based at least in part on determining the default connected discontinuous reception configuration.

Aspect 13: The method of any of aspects 1 through 12, further comprising: activating one or more network power saving features at the UE based at least in part on the set of features currently active at the base station indicated by the first network power mode, wherein communicating with the base station according to the indicated connected discontinuous reception configuration is further based at least in part on the activated one or more network power saving features.

Aspect 14: The method of any of aspects 1 through 13, wherein communicating with the base station comprises: determining an active subset of transmission reception points of the base station corresponding to the first network power mode; and communicating with one or more transmission reception points of the active subset of transmission reception points.

Aspect 15: The method of any of aspects 1 through 14, wherein communicating with the base station comprises: determining an active subset of communication beams of the base station corresponding to the first network power mode; and communicating using one or more communication beams of the active subset of communication beams.

Aspect 16: The method of any of aspects 1 through 15, wherein the first network power mode comprises a nominal power mode or an enhanced power saving mode.

Aspect 17: A method for wireless communications at a base station, comprising: transmitting first control signaling configuring a UE with a plurality of connected discontinuous reception configurations, each connected discontinuous reception configuration of the plurality of connected discontinuous reception configurations corresponding to a respective network power mode; operating using a set of features currently active at the base station according to a first network power mode at the base station; transmitting, to the UE, second control signaling comprising an identifier indicating a connected discontinuous reception configuration of the plurality of connected discontinuous reception configurations for the UE, the indicated connected discontinuous reception configuration corresponding to the first network power mode at the base station; and communicating with the UE according to the indicated connected discontinuous reception configuration and based at least in part on the first network power mode.

Aspect 18: The method of aspect 17, further comprising: transmitting third control signaling before transmitting the first control signaling, the third control signaling configuring the UE with a first plurality of connected discontinuous reception configurations, wherein the plurality of connected discontinuous reception configurations comprises a second plurality of connected discontinuous reception configurations and the first control signaling configures the UE with the second plurality of connected discontinuous reception configurations that is a subset of the first plurality of connected discontinuous reception configurations.

Aspect 19: The method of aspect 18, wherein the first control signaling indicates a mapping of bit values from a plurality of bit values to respective connected discontinuous reception configurations of the second plurality of connected discontinuous reception configurations; and the identifier of the second control signaling comprises a bit field indicating a bit value of the plurality of bit values corresponding to the indicated connected discontinuous reception configuration according to the mapping.

Aspect 20: The method of aspect 19, further comprising: selecting the second plurality of connected discontinuous reception configurations based at least in part on a quantity of connected discontinuous reception configurations supported by the second control signaling according to a size of the bit field.

Aspect 21: The method of any of aspects 18 through 20, wherein the third control signaling comprises radio resource control signaling, the first control signaling comprises a medium access control element, and the second control signaling comprises a downlink control information message.

Aspect 22: The method of any of aspects 17 through 21, wherein the first control signaling comprises radio resource control signaling and the second control signaling comprises a downlink control information message, a medium access control element, or both.

Aspect 23: The method of any of aspects 17 through 22, further comprising: operating according to a discontinuous transmission configuration, wherein an on duration of the discontinuous transmission configuration is at least partially concurrent with an on duration of the indicated connected discontinuous reception configuration.

Aspect 24: The method of aspect 23, further comprising: selecting the indicated connected discontinuous reception configuration based at least in part on the discontinuous transmission configuration, wherein transmitting the second control signaling is based at least in part on the selecting.

Aspect 25: The method of any of aspects 17 through 24, further comprising: switching to a second network power mode at the base station different from the first network power mode; activating one or more first features at the base station, deactivating one or more second features at the base station, or both based at least in part on the set of features currently active at the base station and the second network power mode; and transmitting, to the UE, third control signaling comprising a second identifier indicating a second connected discontinuous reception configuration of the plurality of connected discontinuous reception configurations for the UE, the indicated second connected discontinuous reception configuration corresponding to the second network power mode at the base station.

Aspect 26: The method of aspect 25, further comprising: triggering the switching to the second network power mode based at least in part on a change in UE traffic at the base station, a change in one or more channel metrics at the base station, or a combination thereof.

Aspect 27: The method of any of aspects 17 through 26, wherein operating using the set of features currently active at the base station comprises: determining an active subset of transmission reception points of the base station, an active subset of communication beams of the base station, or both corresponding to the first network power mode, wherein communicating with the UE comprises communicating with the UE using one or more transmission reception points of the active subset of transmission reception points, one or more communication beams of the active subset of communication beams, or both.

Aspect 28: An apparatus for wireless communications at a UE, comprising a processor; memory coupled with the processor; and instructions stored in the memory and executable by the processor to cause the apparatus to perform a method of any of aspects 1 through 16.

Aspect 29: An apparatus for wireless communications at a UE, comprising at least one means for performing a method of any of aspects 1 through 16.

Aspect 30: A non-transitory computer-readable medium storing code for wireless communications at a UE, the code comprising instructions executable by a processor to perform a method of any of aspects 1 through 16.

Aspect 31: An apparatus for wireless communications at a base station, comprising a processor; memory coupled with the processor; and instructions stored in the memory and executable by the processor to cause the apparatus to perform a method of any of aspects 17 through 27.

Aspect 32: An apparatus for wireless communications at a base station, comprising at least one means for performing a method of any of aspects 17 through 27.

Aspect 33: A non-transitory computer-readable medium storing code for wireless communications at a base station, the code comprising instructions executable by a processor to perform a method of any of aspects 17 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communications at a user equipment (UE), comprising:
   receiving first control signaling configuring the UE with a plurality of connected discontinuous reception configurations, each connected discontinuous reception configuration of the plurality of connected discontinuous reception configurations corresponding to a respective network power mode;
   receiving second control signaling comprising an identifier indicating a connected discontinuous reception configuration of the plurality of connected discontinuous reception configurations corresponding to a first network power mode at a network entity, the first network power mode indicating a set of features currently active at the network entity; and
   communicating with the network entity according to the indicated connected discontinuous reception configuration and based at least in part on the first network power mode.

2. The method of claim 1, further comprising:
   receiving third control signaling before receiving the first control signaling, the third control signaling configuring the UE with a first plurality of connected discontinuous reception configurations, wherein the plurality of connected discontinuous reception configurations comprises a second plurality of connected discontinuous reception configurations, and wherein the first control signaling configures the UE with the second plurality of connected discontinuous reception configurations that is a subset of the first plurality of connected discontinuous reception configurations.

3. The method of claim 2, wherein:
   the first control signaling indicates a mapping of bit values from a plurality of bit values to respective connected discontinuous reception configurations of the second plurality of connected discontinuous reception configurations; and
   the identifier of the second control signaling comprises a bit field indicating a bit value of the plurality of bit values corresponding to the indicated connected discontinuous reception configuration according to the mapping.

4. The method of claim 3, wherein a quantity of connected discontinuous reception configurations in the second plurality of connected discontinuous reception configurations is based at least in part on a size of the bit field.

5. The method of claim 2, wherein the third control signaling comprises radio resource control signaling, the first control signaling comprises a medium access control element, and the second control signaling comprises a downlink control information message.

6. The method of claim 1, wherein the first control signaling comprises radio resource control signaling and the second control signaling comprises a downlink control information message, a medium access control element, or both.

7. The method of claim 1, further comprising:
   switching to the indicated connected discontinuous reception configuration after receiving the second control signaling according to a timeline, wherein communicating with the network entity according to the indicated connected discontinuous reception configuration is based at least in part on the switching.

8. The method of claim 7, further comprising:
   determining the timeline based at least in part on the first control signaling, the second control signaling, or both, wherein switching to the indicated connected discontinuous reception configuration is based at least in part on determining the timeline.

9. The method of claim 7, further comprising:
   transmitting a UE capability message indicating the timeline, wherein switching to the indicated connected discontinuous reception configuration is based at least in part on the UE capability message indicating the timeline.

10. The method of claim 1, further comprising:
receiving third control signaling comprising a second identifier indicating a second connected discontinuous reception configuration of the plurality of connected discontinuous reception configurations, the indicated second connected discontinuous reception configuration corresponding to a second network power mode at the network entity; and
communicating with the network entity according to the indicated second connected discontinuous reception configuration and based at least in part on the second network power mode.

11. The method of claim 1, further comprising:
determining an active time for the indicated connected discontinuous reception configuration based at least in part on the first control signaling, the second control signaling, or both, wherein communicating with the network entity according to the indicated connected discontinuous reception configuration is further based at least in part on the active time; and
switching to a default connected discontinuous reception configuration after the active time.

12. The method of claim 11, further comprising:
determining the default connected discontinuous reception configuration based at least in part on the first control signaling, wherein switching to the default connected discontinuous reception configuration is based at least in part on determining the default connected discontinuous reception configuration.

13. The method of claim 1, further comprising:
activating one or more network power saving features at the UE based at least in part on the set of features currently active at the network entity indicated by the first network power mode, wherein communicating with the network entity according to the indicated connected discontinuous reception configuration is further based at least in part on the activated one or more network power saving features.

14. The method of claim 1, wherein communicating with the network entity comprises:
determining an active subset of transmission reception points of the network entity corresponding to the first network power mode; and
communicating with one or more transmission reception points of the active subset of transmission reception points.

15. The method of claim 1, wherein communicating with the network entity comprises:
determining an active subset of communication beams of the network entity corresponding to the first network power mode; and
communicating using one or more communication beams of the active subset of communication beams.

16. The method of claim 1, wherein the first network power mode comprises a nominal power mode or an enhanced power saving mode.

17. A method for wireless communications at a network entity, comprising:
transmitting first control signaling configuring a user equipment (UE) with a plurality of connected discontinuous reception configurations, each connected discontinuous reception configuration of the plurality of connected discontinuous reception configurations corresponding to a respective network power mode;
operating using a set of features currently active at the network entity according to a first network power mode at the network entity;
transmitting, to the UE, second control signaling comprising an identifier indicating a connected discontinuous reception configuration of the plurality of connected discontinuous reception configurations for the UE, the indicated connected discontinuous reception configuration corresponding to the first network power mode at the network entity; and
communicating with the UE according to the indicated connected discontinuous reception configuration and based at least in part on the first network power mode.

18. The method of claim 17, further comprising:
transmitting third control signaling before transmitting the first control signaling, the third control signaling configuring the UE with a first plurality of connected discontinuous reception configurations, wherein the plurality of connected discontinuous reception configurations comprises a second plurality of connected discontinuous reception configurations and the first control signaling configures the UE with the second plurality of connected discontinuous reception configurations that is a subset of the first plurality of connected discontinuous reception configurations.

19. The method of claim 18, wherein:
the first control signaling indicates a mapping of bit values from a plurality of bit values to respective connected discontinuous reception configurations of the second plurality of connected discontinuous reception configurations; and
the identifier of the second control signaling comprises a bit field indicating a bit value of the plurality of bit values corresponding to the indicated connected discontinuous reception configuration according to the mapping.

20. The method of claim 19, further comprising:
selecting the second plurality of connected discontinuous reception configurations based at least in part on a quantity of connected discontinuous reception configurations supported by the second control signaling according to a size of the bit field.

21. The method of claim 18, wherein the third control signaling comprises radio resource control signaling, the first control signaling comprises a medium access control element, and the second control signaling comprises a downlink control information message.

22. The method of claim 17, wherein the first control signaling comprises radio resource control signaling and the second control signaling comprises a downlink control information message, a medium access control element, or both.

23. The method of claim 17, further comprising:
operating according to a discontinuous transmission configuration, wherein an on duration of the discontinuous transmission configuration is at least partially concurrent with an on duration of the indicated connected discontinuous reception configuration.

24. The method of claim 23, further comprising:
selecting the indicated connected discontinuous reception configuration based at least in part on the discontinuous transmission configuration, wherein transmitting the second control signaling is based at least in part on the selecting.

25. The method of claim 17, further comprising:
switching to a second network power mode at the network entity different from the first network power mode;

activating one or more first features at the network entity, deactivating one or more second features at the network entity, or both based at least in part on the set of features currently active at the network entity and the second network power mode; and transmitting, to the UE, third control signaling comprising a second identifier indicating a second connected discontinuous reception configuration of the plurality of connected discontinuous reception configurations for the UE, the indicated second connected discontinuous reception configuration corresponding to the second network power mode at the network entity.

26. The method of claim 25, further comprising:
triggering the switching to the second network power mode based at least in part on a change in UE traffic at the network entity, a change in one or more channel metrics at the network entity, or a combination thereof.

27. The method of claim 17, wherein operating using the set of features currently active at the network entity comprises:
determining an active subset of transmission reception points of the network entity, an active subset of communication beams of the network entity, or both corresponding to the first network power mode, wherein communicating with the UE comprises communicating with the UE using one or more transmission reception points of the active subset of transmission reception points, one or more communication beams of the active subset of communication beams, or both.

28. An apparatus for wireless communications at a user equipment (UE), comprising:
a processor;
memory coupled with the processor; and
instructions stored in the memory and executable by the processor to cause the apparatus to:
receive first control signaling configuring the UE with a plurality of connected discontinuous reception configurations, each connected discontinuous reception configuration of the plurality of connected discontinuous reception configurations corresponding to a respective network power mode;
receive second control signaling comprising an identifier indicating a connected discontinuous reception configuration of the plurality of connected discontinuous reception configurations corresponding to a first network power mode at a network entity, the first network power mode indicating a set of features currently active at the network entity; and
communicate with the network entity according to the indicated connected discontinuous reception configuration and based at least in part on the first network power mode.

29. The apparatus of claim 28, wherein the instructions are further executable by the processor to cause the apparatus to:
receive third control signaling before receiving the first control signaling, the third control signaling configuring the UE with a first plurality of connected discontinuous reception configurations, wherein the plurality of connected discontinuous reception configurations comprises a second plurality of connected discontinuous reception configurations, and wherein the first control signaling configures the UE with the second plurality of connected discontinuous reception configurations that is a subset of the first plurality of connected discontinuous reception configurations.

30. An apparatus for wireless communications at a network entity, comprising:
a processor;
memory coupled with the processor; and
instructions stored in the memory and executable by the processor to cause the apparatus to:
transmit first control signaling configuring a user equipment (UE) with a plurality of connected discontinuous reception configurations, each connected discontinuous reception configuration of the plurality of connected discontinuous reception configurations corresponding to a respective network power mode;
operate using a set of features currently active at the network entity according to a first network power mode at the network entity;
transmit, to the UE, second control signaling comprising an identifier indicating a connected discontinuous reception configuration of the plurality of connected discontinuous reception configurations for the UE, the indicated connected discontinuous reception configuration corresponding to the first network power mode at the network entity; and
communicate with the UE according to the indicated connected discontinuous reception configuration and based at least in part on the first network power mode.

* * * * *